(12) United States Patent
Araki et al.

(10) Patent No.: US 11,686,975 B2
(45) Date of Patent: Jun. 27, 2023

(54) IMAGING DEVICE HAVING DIMMING ELEMENT

(71) Applicant: Japan Display Inc., Tokyo (JP)

(72) Inventors: Shigesumi Araki, Tokyo (JP); Toshiharu Matsushima, Tokyo (JP); Shinichi Komura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/536,185

(22) Filed: Nov. 29, 2021

(65) Prior Publication Data

US 2022/0082877 A1 Mar. 17, 2022

Related U.S. Application Data

(63) Continuation of application No. 16/817,739, filed on Mar. 13, 2020, now Pat. No. 11,221,521.

(30) Foreign Application Priority Data

Mar. 19, 2019 (JP) .................................. 2019-051079

(51) Int. Cl.
| | |
|---|---|
| *G02F 1/13363* | (2006.01) |
| *G02F 1/1335* | (2006.01) |
| *G02F 1/1339* | (2006.01) |
| *G02F 1/1343* | (2006.01) |

(52) U.S. Cl.
CPC ........ *G02F 1/13363* (2013.01); *G02F 1/1339* (2013.01); *G02F 1/133528* (2013.01); *G02F 1/134309* (2013.01); *G02F 1/133531* (2021.01); *G02F 1/133638* (2021.01); *G02F 2413/02* (2013.01); *G02F 2413/05* (2013.01)

(58) Field of Classification Search
None
See application file for complete search history.

(56) References Cited

U.S. PATENT DOCUMENTS

| | | | |
|---|---|---|---|
| 11,221,521 B2* | 1/2022 | Araki | G02F 1/1333 |
| 2008/0137018 A1* | 6/2008 | Lin | G02F 1/134363 |
| | | | 349/139 |
| 2012/0147298 A1* | 6/2012 | Lai | G02F 1/133502 |
| | | | 349/96 |
| 2015/0070633 A1* | 3/2015 | Miyazaki | G02F 1/13363 |
| | | | 349/96 |
| 2016/0161664 A1* | 6/2016 | Ishida | G02B 6/0045 |
| | | | 359/230 |
| 2020/0168691 A1* | 5/2020 | Choi | H01L 27/3276 |
| 2021/0191193 A1* | 6/2021 | Liu | G02F 1/133528 |

* cited by examiner

*Primary Examiner* — Shan Liu

(74) *Attorney, Agent, or Firm* — Michael Best & Friedrich LLP

(57) ABSTRACT

Provided is a display device including an array substrate, a pixel, a dimming element, and a counter substrate. The pixel is located over the array substrate and includes a first electrode, a second electrode, and a liquid crystal layer over the first electrode and the second electrode. The dimming element is located over the array substrate and includes a third electrode, the liquid crystal layer over the third electrode, and a fourth electrode over the liquid crystal layer. The counter substrate is located over the fourth electrode.

9 Claims, 22 Drawing Sheets

320

324

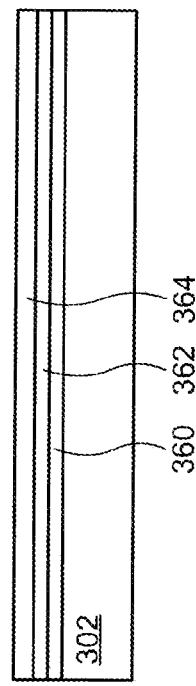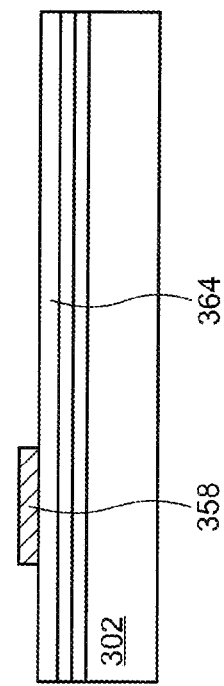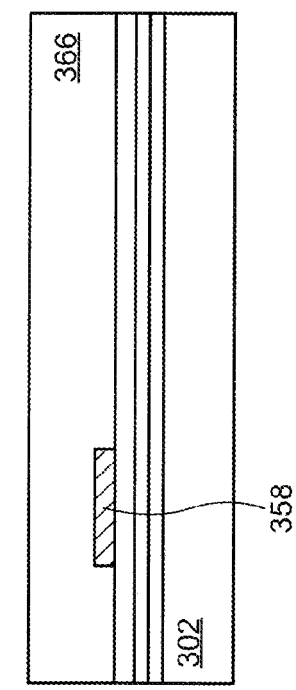
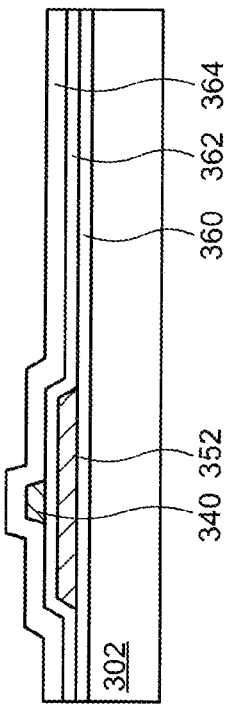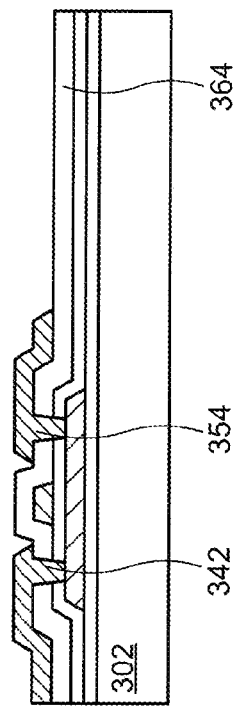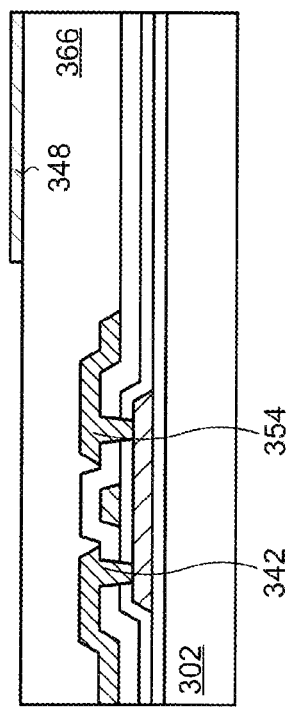
FIG. 19A  FIG. 19B  FIG. 19C

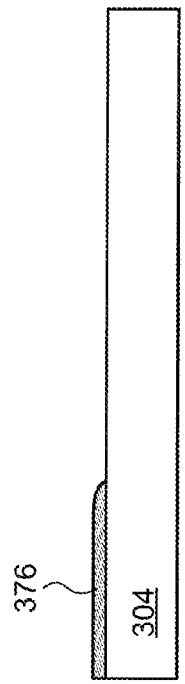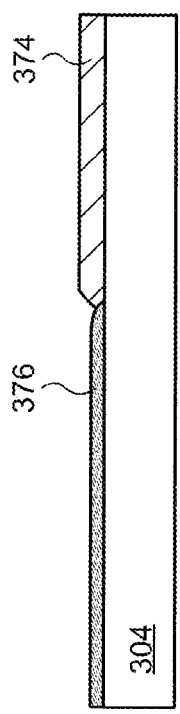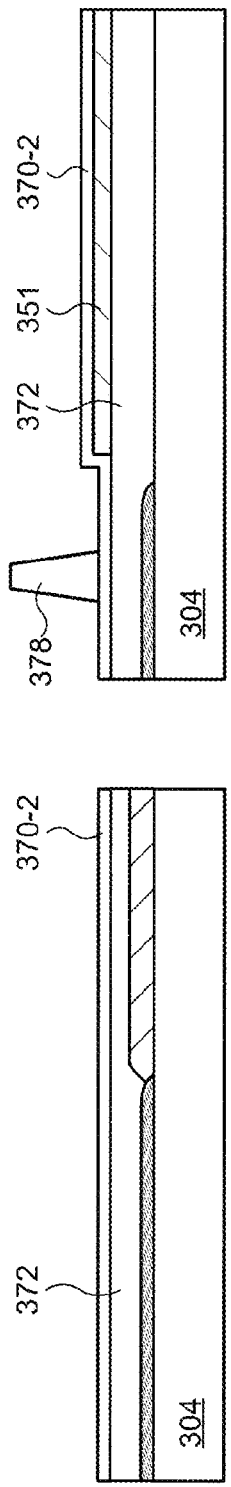
FIG. 21A
FIG. 21B
FIG. 21C

IMAGING DEVICE HAVING DIMMING ELEMENT

CROSS REFERENCE TO RELATED APPLICATIONS

This application is a continuation of U.S. patent application Ser. No. 16/817,739, filed on Mar. 13, 2020. Further, this application is based on and claims the benefit of priority from the prior Japanese Patent Application No. 2019-51079, filed on Mar. 19, 2019, the entire contents of which are incorporated herein by reference.

FIELD

The present invention relates to a display device and a manufacturing method of the display device. For example, the present invention relates to a display device with a pixel including a liquid crystal element and a manufacturing method thereof.

BACKGROUND

A liquid crystal display device is represented as one of the most commonly used display devices. For example, liquid crystal display devices have been widely utilized as an interface of a variety of electronic devices including not only a television device but also a computer, a tablet, a portable telephone, and the like.

In recent years, many small-size portable electronic terminals are designed so that the region (frame region or peripheral region) other than the display region is as small as possible in order to expand a display surface for improved display visibility and improved designability. In such a design strategy, the region required by the elements supporting the functions of the electronic terminals, such as an image-capturing element, a sensor, and an audio inputting/outputting device, is strictly limited. Hence, it has been proposed to form a cutoff or an opening in a part of a display and arrange an image-capturing element, a sensor, or the like therein. For example, it is disclosed in Japanese Patent Application Publication No. 2010-15015 and Japanese Patent No. 2869452 that a display device is configured so that a structure or a driving method of a portion of a display region is different from that of the other portion to form a light-transmitting region in the portion of the display region. The use of this light-transmitting region allows a variety of elements to be arranged at a position overlapping with the display region.

SUMMARY

An embodiment of the present invention is a display device. The display device possesses an array substrate, a pixel, a dimming element, and a counter substrate. The pixel is located over the array substrate and includes a first electrode, a second electrode, and a liquid crystal layer over the first electrode and the second electrode. The dimming element is located over the array substrate and includes a third electrode, the liquid crystal layer over the third electrode, and a fourth electrode over the liquid crystal layer. The counter substrate is located over the fourth electrode.

An embodiment of the present invention is a display device. The display device possesses an array substrate, a pixel, a dimming element, a black matrix, a counter substrate, a first linear polarizing plate, a second linear polarizing plate, and a third linear polarizing plate. The pixel is located over the array substrate and includes a first electrode, a second electrode, and a liquid crystal layer over the first electrode and the second electrode. The dimming element is located over the array substrate and includes a third electrode, a fourth electrode, and the liquid crystal layer over the third electrode and the fourth electrode. The black matrix is located over the liquid crystal layer. The counter substrate is located over the black matrix. The first linear polarizing plate is located under the array substrate and overlaps with the pixel. The second linear polarizing plate is located over the counter substrate and overlaps with the pixel and the dimming element. The third linear polarizing plate is located under the array substrate and overlaps with the dimming element. The black matrix overlaps with the first linear polarizing plate and the third linear polarizing plate.

An embodiment of the present invention is a manufacturing method of a display device. The manufacturing method includes forming a first electrode over an array substrate, forming an interelectrode insulating film over the first electrode, forming a second electrode and a third electrode over the interelectrode insulating film, forming a fourth electrode over a counter electrode, and forming a liquid crystal layer between the array substrate and the counter substrate so that the first electrode, the second electrode, the third electrode, and the fourth electrode are sandwiched by the array substrate and the counter electrode, the fourth electrode overlaps with the third electrode, and the first electrode and the second electrode are exposed from the fourth electrode.

BRIEF DESCRIPTION OF DRAWINGS

FIG. 19A to FIG. 19C are schematic cross-sectional views for explaining a manufacturing method of a display device according to an embodiment of the present invention;

FIG. 21A to FIG. 21C are schematic cross-sectional views for explaining a manufacturing method of a display device according to an embodiment of the present invention.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. A reference number is used when plural structures which are the same as or similar to each other are collectively represented, while a hyphen and a natural number are added behind the reference number when these structures are independently represented.

In the present specification and claims, when a plurality of films is formed by processing one film, the plurality of films may have functions or roles different from each other. However, the plurality of films originates from a film formed as the same layer in the same process and has the same layer structure and the same material. Therefore, the plurality of films is defined as films existing in the same layer.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

First Embodiment

In the present invention, a structure of a display device 100 according to an embodiment of the present invention is described.

1. Outline Structure

Figure 1:
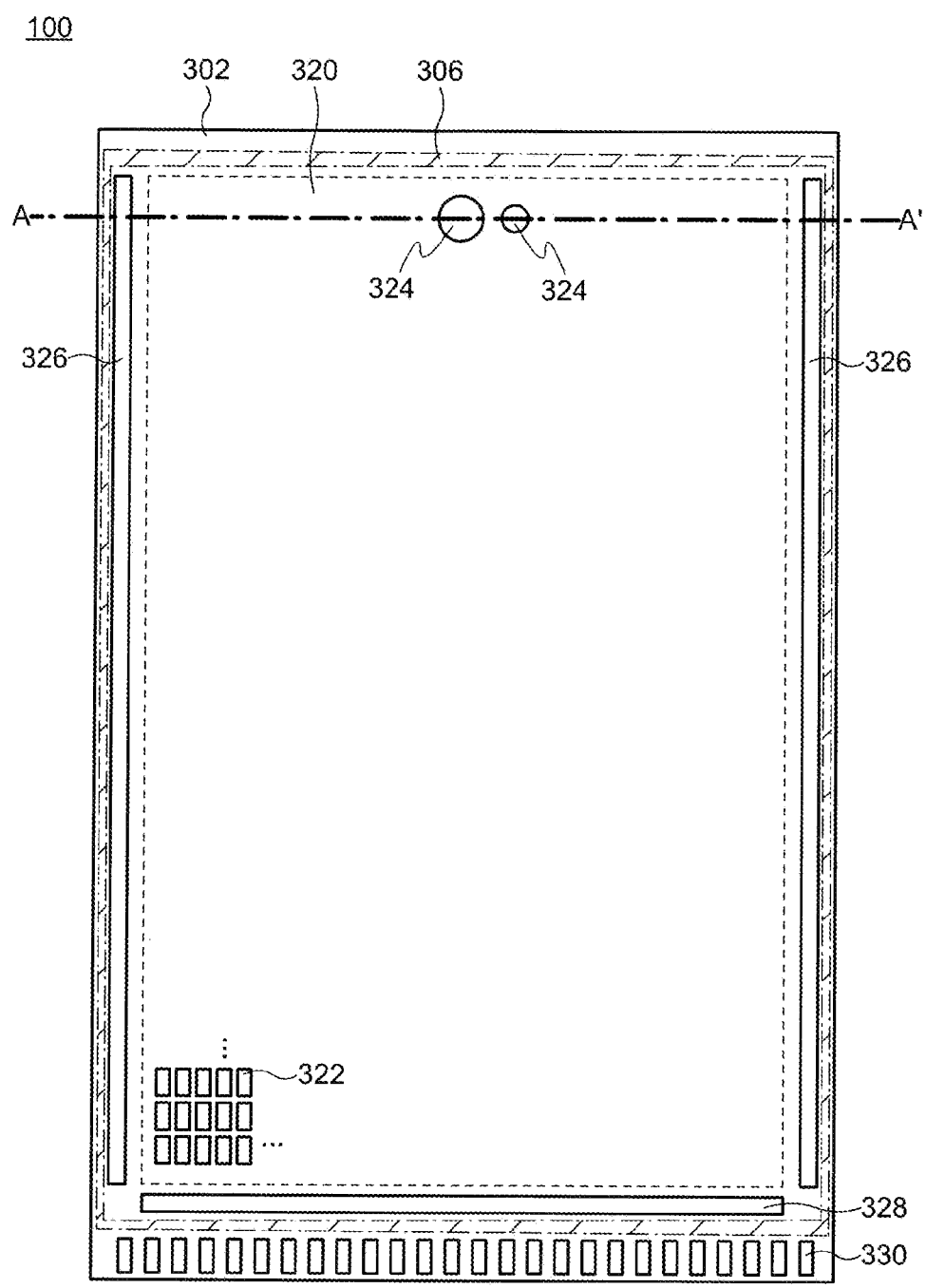
FIG. 1 is a schematic top view of a display device according to an embodiment of the present invention.
Figure 2:
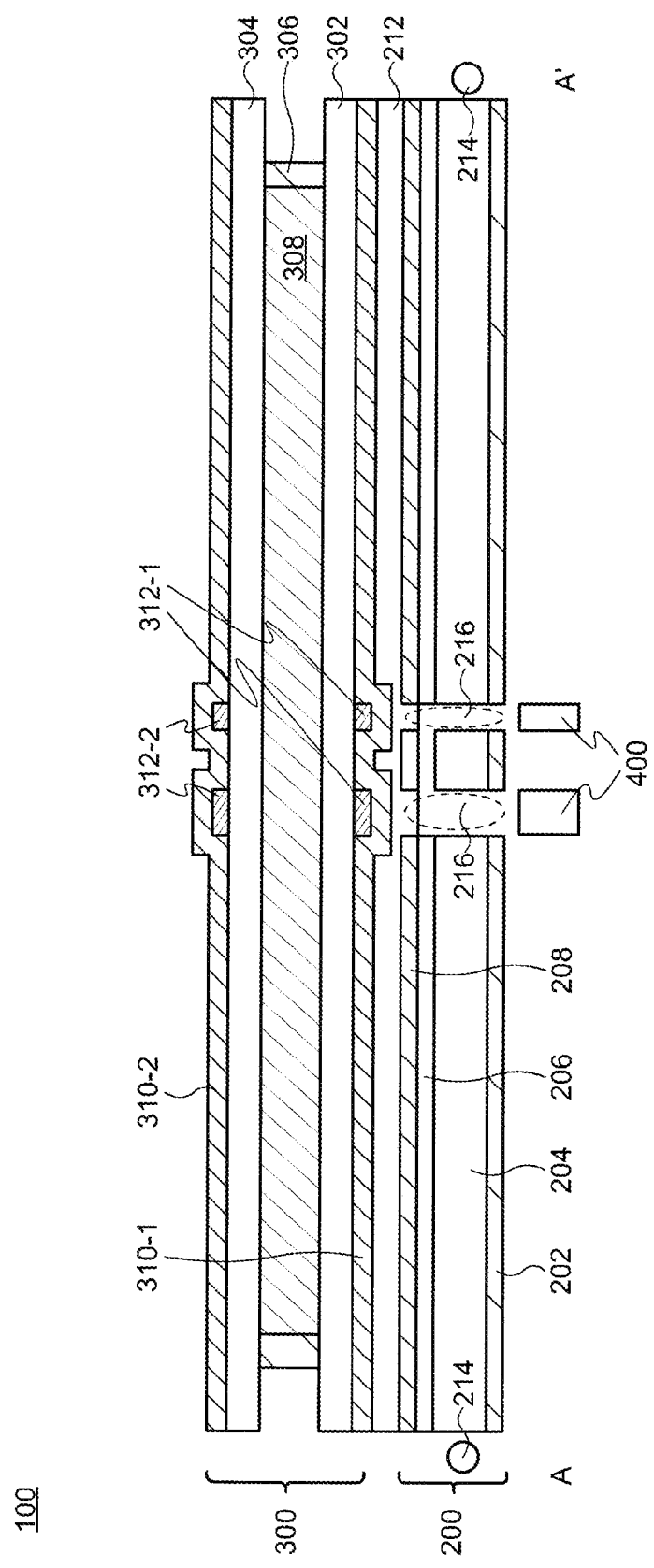
FIG. 2 is a schematic cross-sectional view of a display device according to an embodiment of the present invention.

The outline structure of the display device 100 is explained using FIG. 1 and FIG. 2. FIG. 1 is a schematic top view of the display device 100, and a schematic view of a cross section along a chain line A-A' in FIG. 1 is illustrated in FIG. 2. As shown in FIG. 1 and FIG. 2, the display device 100 possesses a display module 300. The display device 100 may further include a backlight unit 200 and a photoelectric transducer 400 underneath the display module 300. In FIG. 2, an example is demonstrated where two photoelectric transducers 400 are provided.

1-1. Display Module 300

As shown in FIG. 2, the display module 300 possesses a pair of substrates 302 and 304 fixed to each other with a sealing material 306 and a liquid crystal layer 308 sealed with the pair of substrates 302 and 304 and the sealing material 306. Hereinafter, the substrates 302 and 304 are referred to as an array substrate 302 and a counter substrate 304, respectively. The sealing material 306 is sandwiched by the array substrate 302 and the counter substrate 304 and provides a single closed shape on the array substrate 302 as shown in FIG. 1. The inside of this closed shape is filled with the liquid crystal layer 308. Thus, a single liquid crystal layer 308 is structured in this single space formed by the array substrate 302, the counter substrate 304, and the sealing material 306. A unit composed of this single crystal layer 308, the array substrate 302, the counter substrate 304, and the sealing material 306 is a liquid crystal cell. One display device 100 possesses a single liquid crystal cell.

The display module 300 may further include a pair of linear polarizing plates 310 and at least one pair of quarter-wave plates (hereinafter, referred to as a λ/4 plate) 312 each sandwiching the array substrate 302 and the counter substrate 304. The pair of λ/4 plates 312 is sandwiched by the pair of linear polarizing plates 310. In FIG. 2, two pairs of λ/4 plates 312 are illustrated. The detailed structure of the display module 300 is described later.

1-2. Backlight Unit

As shown in FIG. 2, the backlight unit 200 is disposed under the array substrate 302 and possesses, as fundamental elements, a reflecting plate 202, a light-guiding plate 204 over the reflecting plate 202, a light source 214 provided on a side surface of the light-guiding plate 204, and a variety of optical films formed over the light-guiding plate 204. The structure of the optical films is arbitrarily determined, and an optical film in which a prism sheet 206 and a light-diffusing film 208 are combined is demonstrated as an example in FIG. 2. The backlight unit 200 is fixed to the display module 300 with an adhesive layer 212.

The light source 214 includes a light-emitting element such as a light-emitting diode and a cold-cathode tube. The light-emitting element is preferred to have an emission wavelength covering the whole of the visible light region. The backlight unit 200 and the light-guiding plate 204 are arranged so that the light from the light-source 214 enters into the light-guide plate 204, and the light-guiding plate 204 is configured to diffuse and reflect the incident light in the inside thereof and to uniformly emit the light in the direction toward the display module 300. The reflecting plate 202 is provided on an opposite side to the display module 300 with respect to the light-guiding plate 204 and is configured to reflect the light radiating to the opposite side to the display module 300 and return the light to the light-guiding plate 204. The prism sheet 206 is provided in order to collect the light emitted from the light-guiding plate 204 and radiate the collected light toward the front direction of the display module 300, and a plurality of prism-shaped depressions and projections is arranged in a stripe form on a surface thereof, for example. The light-diffusing film 208 is a member for making the light uniform and includes light-diffusing fine particles and a polymer matrix fixing the fine particles.

At least one through hole 216 passing through at least the light-guiding plate 204 and the reflecting plate 202 is formed in the backlight unit 200. The number of the through holes 216 may be the same as the number of the photoelectric transducers 400, and an example is shown in FIG. 2 where two through holes 216 respectively corresponding to two photoelectric transducers 400 are disposed. In the example demonstrated in FIG. 2, through holes overlapping with the through holes 216 are also formed in the prism sheet 206 and the light-diffusing film 208. It is not always necessary to form these through holes.

1-3. Semiconductor Element

The photoelectric transducer 400 is provided so as to overlap with the through hole 216. In FIG. 2, a state is demonstrated where two photoelectric transducers 400 respectively overlap with the through holes 216. The function and the structure of the photoelectric transducer 400 may be arbitrarily selected, and an image-capturing element such as a CCD (Charge-Coupled Device) image sensor and a CMOS (Complementary Metal Oxide Semiconductor) image sensor, a photosensor, and the like are exemplified.

2. Structure of Display Module

Hereinafter, the structure of the display module 300 is explained in detail.

2-1. Layout

A variety of patterned semiconductor films, insulating films, and conductive films is stacked over the array substrate 302, and a plurality of pixels 322, a dimming element 324, circuits for driving these elements (scanning-line driver circuits 326 and signal-line driver circuit 328), terminals 330, and the like are structured by these films (FIG. 1). An example is demonstrated in FIG. 1 in which two dimming elements 324 are provided. However, the number of the dimming elements 324 is not limited and may be one. Three or more dimming elements 324 may be included. As described below, liquid crystal elements different in operation mode from each other are respectively arranged in the pixel 322 and the dimming element 324.

The pixel 322 is structured to allow a part of the light from the backlight unit 200 to pass toward the outside of the display device 100 and serves as a minimum unit providing information of a single color. The pixel 322 possesses a pixel circuit and the liquid crystal layer 308 overlapping with the pixel circuit as fundamental elements. The arrangement of the plurality of pixels 322 is not limited, and the plurality of pixels 322 may be arranged in a variety of arrangements such as the tripe arrangement, the mosaic arrangement, and the delta arrangement. A region defined by the plurality of pixels 322 is a display region 320. The pixels 322 are arranged so as not to overlap with the thorough hole 216.

Figure 3:
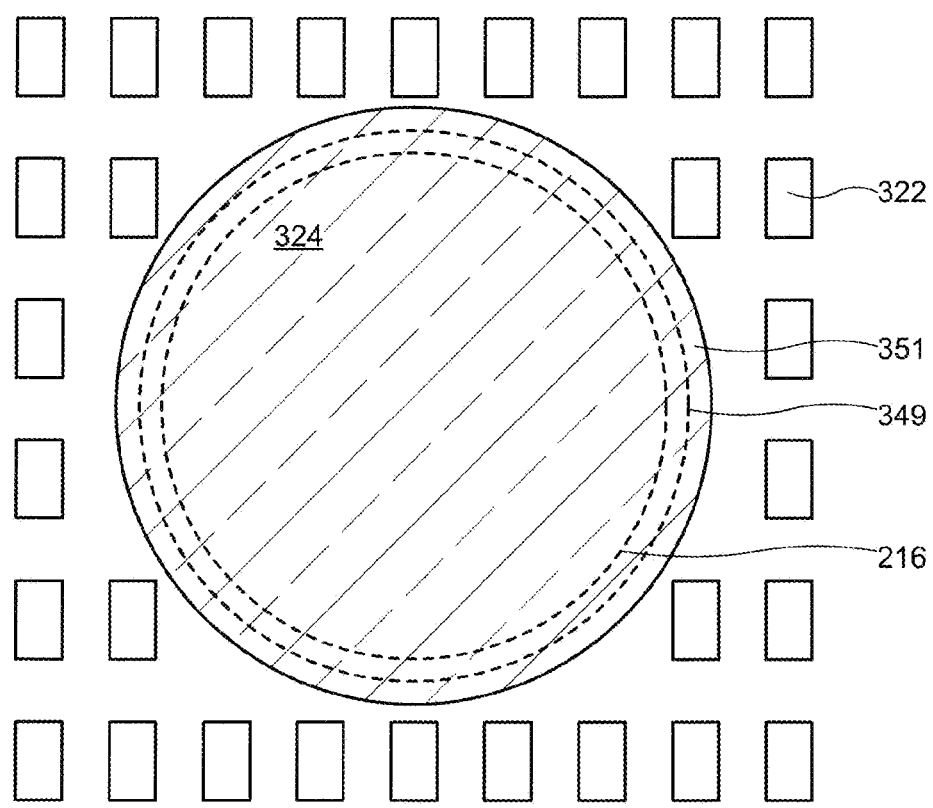
FIG. 3 is a schematic top view of pixels and a dimming element of a display device according to an embodiment of the present invention.

A schematic top view of the dimming element 324 and the periphery thereof is shown in FIG. 3. The dimming element 324 is located in the display region 320, and one dimming element 324 is arranged so as to be surrounded by the plurality of pixels 322. The dimming element 324 may be configured so that the size (area) thereof is larger than that of each pixel 322. The shape of the dimming element 324 is not limited to a circular shape shown in FIG. 3 and may be arbitrarily determined. For example, an arbitral shape such as a quadrangle including a square, a rectangle, a trapezoid, and the like, a polygon, and an ellipse may be employed.

The dimming element 324 is arranged at the position overlapping with the through hole 216. Thus, the dimming element 324 may overlap with the photoelectric transducer 400. A pixel circuit having a different structure from that of the pixel circuit in the pixel 322 is also formed in the dimming element 324, and the dimming element 324 possesses this pixel circuit and the liquid crystal layer 308 overlapping with the pixel circuit as fundamental elements. The dimming element 324 has a function to control transmissivity of outside light, which allows the amount of the light incident on the photoelectric transducer 400 to be adjusted.

A variety of signal lines (a gate line, an image-signal line, an initializing signal line, a power source line, and the like), which is not illustrated, extend from the scanning-line driver circuits 326 and the signal-line driver circuit 328 to the display region 320, and these signal lines are electrically connected to the respective pixels 322 and the dimming element 324. A connector such as a flexible printed circuit substrate (FPC), which is not illustrated, is connected to the terminals 330, and the signals and a power source supplied from an external circuit (not illustrated) are provided to the scanning-line driver circuits 326, the signal-line driver circuit 328, the pixels 322, and the dimming element 324 through the connector and the terminals 330. The scanning-line driver circuits 326 and the signal-line driver circuit 328 operate the pixel circuits in the pixels 322 and the dimming element 324 on the basis of the supplied signals and power source, by which orientation of the liquid crystal molecules in the liquid crystal layer 308 is controlled, the amount of the light provided from the backlight unit 200 is controlled in the pixels 322, and the amount of the incident outside light is controlled in the dimming element 324.

2-2. Pixel

Figure 4:
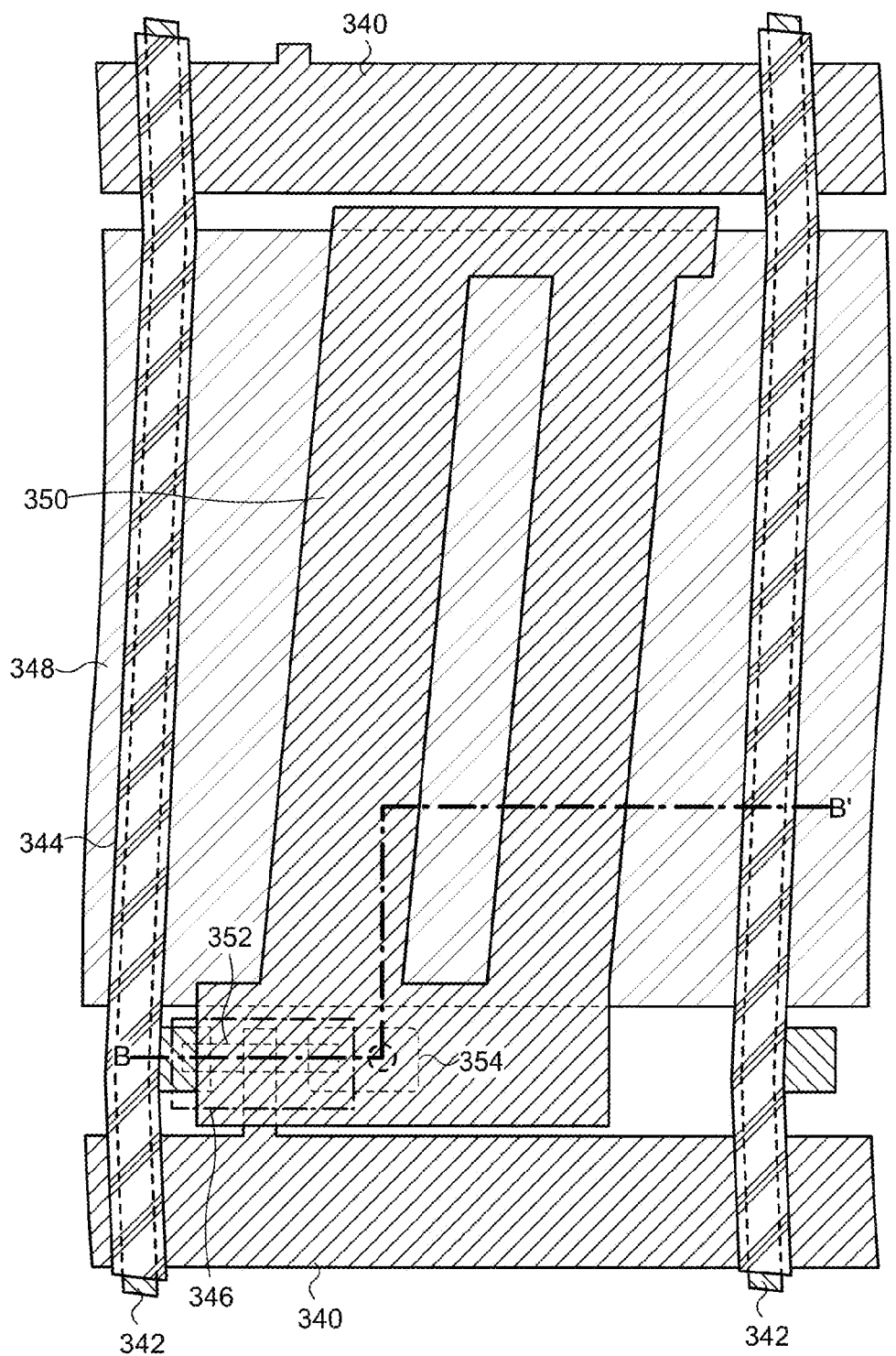
FIG. 4 is a schematic top view of a pixel of a display device according to an embodiment of the present invention.
Figure 5:
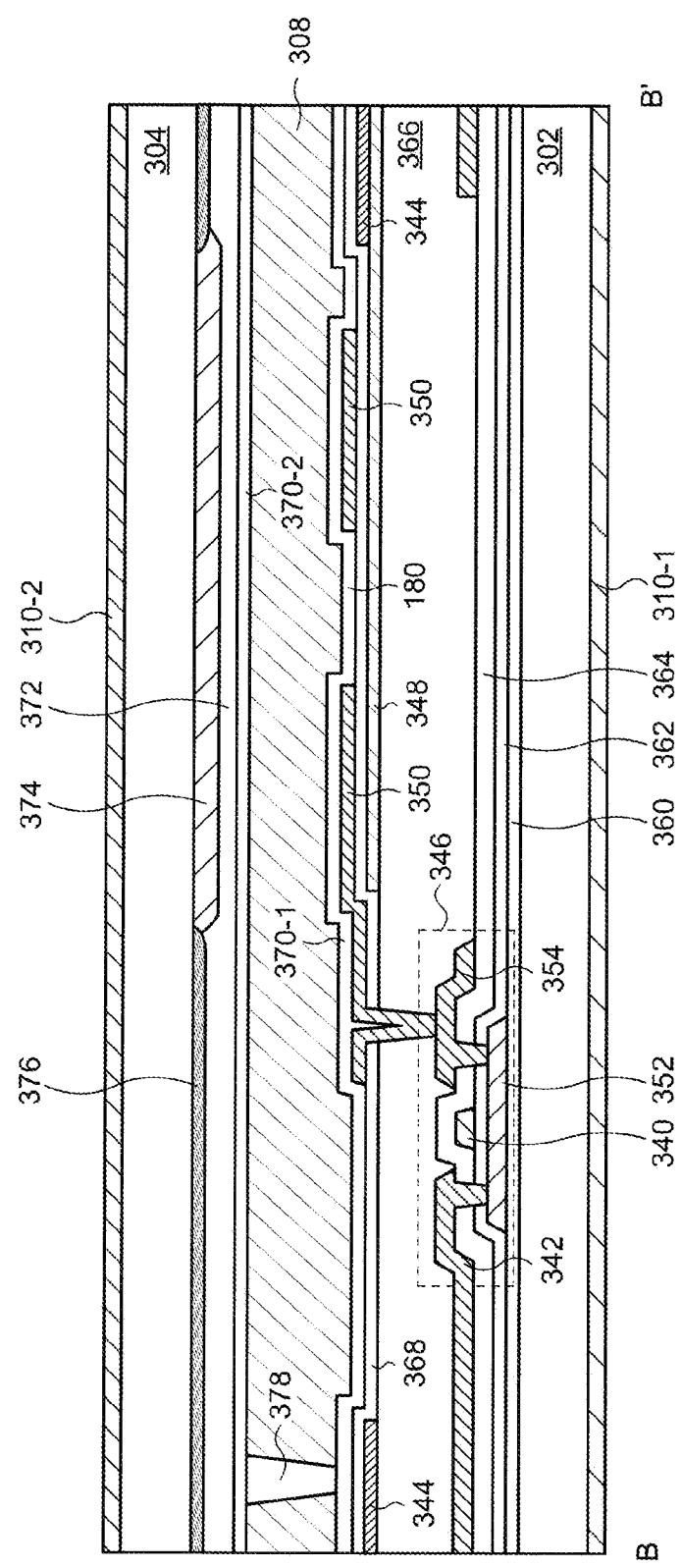
FIG. 5 is a schematic cross-sectional view of a pixel of a display device according to an embodiment of the present invention.

An example of the layout of the pixels 322 is shown in FIG. 4, whereas a schematic view of a cross section along a chain line B-B' in FIG. 4 is shown in FIG. 5. As shown in these figures, the pixel circuit in the pixel 322 includes a pixel electrode 350, a common electrode 348, a transistor 346 electrically connected to the pixel electrode 350, the liquid crystal layer 308 provided over the pixel electrode 350 and the common electrode 348, orientation films (a first orientation film 370-1 and a second orientation film 370-2), and the like. The pixel 322 is electrically connected to the gate line 340 extending from the scanning-line driver circuit 326, the image signal line 342 extending from the signal-line driver circuit 342, and the power-source line 344. The pixel circuit shown in these figures is merely an example and may include other elements such as a storage capacitor and a transistor.

As shown in FIG. 5, the pixel circuit is disposed over the array substrate 302 through an undercoat 360. The array substrate 302 includes a material selected from glass, quartz, a plastic containing a polymer such as a polyamide, or the like. The undercoat 360 functions as a protection film for preventing diffusion of impurities in the array substrate 302 and is composed of one or a plurality of films including a silicon-containing inorganic compound such as silicon oxide and silicon nitride.

The transistor 346 is structured by a semiconductor film 352, a part of a gate insulating film 362, a part of the gate line 340, a part of an interlayer insulating film 364, a part of the image-signal line 342, a drain electrode 354, and the like. A part of the gate line 340 overlapping with the semiconductor film 352 functions as a gate electrode of the transistor 346, while a part of the aforementioned image-signal line 342 functions as a source electrode of the transistor 346. Openings reaching the semiconductor film 352 are formed in the gate insulating film 362 and the interlayer insulating film 364, and the drain electrode 354 and the source electrode are electrically connected to the semiconductor film 352 through these openings. In the example demonstrated here, the transistor 346 is a top-gate type transistor. However, the transistor 346 may be a transistor having another structure (a bottom-gate type transistor, etc.).

A leveling film 366 is disposed over the transistor 346, by which depressions and projections formed by the transistor 346 are absorbed to provide a flat surface. The leveling film 366 includes a polymer material such as an acrylic resin, an epoxy resin, a polysiloxane resin, and a polyamide.

The common electrode 348 is arranged over the leveling film 366. The common electrode 348 is formed to be shared by the plurality of pixels 322. For example, the common electrode 348 is arranged parallel to the gate line 340 and shared by the plurality of pixels 322 connected to one gate line 340 as shown in FIG. 4. Although not illustrated, the common electrode 348 may be arranged parallel to the image-signal line 342 to be shared by the plurality of pixels 322 connected to one image-signal line 342 or may be formed to be shared by all of the pixels 322.

The power-source line 344 in contact with the common electrode 348 is disposed over the common electrode 348. The power-source line 344 may be arranged to overlap with the image-signal line 342. A potential (Vcom) slightly lower than an intermediate potential between the maximum and minimum potentials of the image signal is supplied to the image-signal line 342, and this potential is provided to the common electrode 348. Although not illustrated, the power-source line 344 may be arranged under the common electrode 348.

The pixel electrode 350 is formed over the common electrode 348 and the power-source line 344 through an interelectrode insulating film 368. The pixel electrode 350 is electrically connected to the drain electrode 354 through an opening formed in the leveling film 366 and the interelectrode insulating film 368. With this structure, the image signal supplied to the image-signal line 342 is provided to the pixel electrode 350 through the transistor 346, and the potential of the pixel electrode 350 is independently controlled for every pixel 322 in accordance with the image signal. As shown in FIG. 4, the pixel electrode 350 possesses a slit having a closed shape, and a part of the pixel electrode 350 is exposed from the slit. Although not illustrated, the pixel electrode 350 may have a cutoff instead of a slit. Alternatively, the pixel electrode 350 may simultaneously possess a slit and a cutoff. Note that a slit is an opening formed in the pixel electrode 350 and having a closed shape, and its outer circumference corresponds to an internal circumference of the pixel electrode 350. When this outer circumference of the opening is a part of an outer circumference of the pixel electrode 350, the opening is defined as a cutoff.

The first orientation film 370-1 is disposed over the pixel electrode 350. The first orientation film 370-1 has a polymer such as a polyimide, and a surface thereof is turned to control the orientation of the liquid crystal molecules included in the liquid crystal layer 308. Specifically, a rubbing treatment is performed on the surface of the first orientation film 370-1. Alternatively, polarized ultraviolet light is applied once or a plurality of times in order to orient the liquid crystalline unit in the first orientation film 370-1 when the first orientation film 370-1 is formed using a photo-curable resin having a liquid crystalline unit. Alternatively, a film of a photo-decomposable type polyimide or the like may be formed, and then polarized ultraviolet light may be applied. Hereinafter, the treatments for orientation control performed on the orientation films 370 are collectively referred to an orientation treatment. The direction in which the liquid crystal molecules orient over the first orientation film 370-1, which is subjected to the orientation treatment, in the absence of an electric field is referred to an orientation treatment direction.

A color filter 374 and a black matrix 376 are formed over the counter substrate 304. A color is provided to the light from the backlight unit 200 by the color filter 374, which enables the pixel 322 to provide color information. The color filter 374 is configured so that optical properties thereof are different between the adjacent pixels 322. The black matrix 376 is configured to exhibit a low transmissivity with respect to visible light or not to substantially transmit visible light and is formed so as to cover the transistor 346, the image-signal line 342, and the gate line 340. As an optional element, an overcoat 372 covering the color filter 374 and the black matrix 376 may be disposed over the counter substrate 304. The counter substrate 304 further possesses the second orientation film 370-2 covering the color filter 374 and the black matrix 376. Similar to the first orientation film 370-1, the orientation treatment is also performed on the second orientation film 370-2, and the orientation treatment direction thereof is the same as that of the first orientation film 370-1.

The liquid crystal layer 308 is provided between the array substrate 302 and the counter substrate 304, and the pixel electrode 350, the common electrode 348, the first orientation film 370-1, and the second orientation film 370-2 are sandwiched by the array substrate 302 and the counter electrode 304. The liquid crystal layer 308 includes a positive-type liquid crystal having a positive dielectric anisotropy. As described above, the liquid crystal layer 308 is sealed in the space formed by the sealing material 306, the array substrate 302, and the counter substrate 304, and the display device 100 possesses a single liquid crystal cell. Hence, one liquid crystal layer 308 is shared by all of the pixels 322.

A distance between the array substrate 302 and the counter substrate 304 is controlled by a spacer 378 formed over the array substrate 302, for example. The spacer 378 includes a polymer such as an acrylic resin and an epoxy resin and is formed for every pixel 322 or for every plural pixels 322. The spacer 378 may be formed over the array substrate 302. Alternatively, a sphere spacer which is not fixed to the array substrate 302 and the counter substrate 304 may be used.

As described above, the display device 100 possesses the pair of linear polarizing plates 310 (a first linear polarizing plate 310-1 and a second linear polarizing plate 310-2). The pair of linear polarizing plates 310 overlaps with the display region 320 and is arranged so as to sandwich the pixels 322. More specifically, the pair of linear polarizing plates 310 is arranged so as to sandwich the array substrate 302 and the counter substrate 304 and overlap with the pixel electrode 350 and the counter electrode 348. In the display device 100, the pair of linear polarizing plates 310 has a crossed Nichol relationship. That is, the pair of linear polarizing plates 310 is arranged so that the transmission axes thereof perpendicularly intersect with each other.

In each pixel 322, the initial orientation of the liquid crystal molecules included in the liquid crystal layer 308 is mainly determined by the orientation treatment directions of the first orientation film 370-1 and the second orientation film 370-2. In the absence of an electric field, the liquid crystal molecules orient along the orientation treatment directions substantially parallel to a surface of the array substrate 302. When a potential difference is provided between the pixel electrode 350 and the common electrode 350, this initial orientation varies. That is, the electric field generated between the pixel electrode 350 and the common electrode 348 and substantially parallel to the surface of the array substrate 302 causes the liquid crystal molecules to rotate in a plane substantially parallel to the surface of the array substrate 302. Accordingly, the orientation direction of the liquid crystal molecules changes, and the control of this change with the potential difference between the pixel electrode 350 and the common electrode 348 enables the light transmissivity of the liquid crystal layer 308 to be controlled, thereby realizing gradation display. Accordingly, an FFS (Fringe Field Switching) liquid crystal element is formed in each pixel 322. Here, a pair of electrodes and a portion of a liquid crystal layer driven by the pair of electrodes are collectively defined as a liquid crystal element in the present specification. Therefore, each pixel 322 possesses a liquid crystal element including the pixel electrode 350, the common electrode 348, and a part of the liquid crystal layer 308 driven by the pixel electrode 350 and the common electrode 348

Although not illustrated, the liquid crystal element in each pixel 322 may be an IPS (In-Plane Switching) liquid crystal element. In this case, the common electrode 348 also has a slit and/or a cutoff, and the pixel 322 is configured so that the common electrode 348 exists in the same layer as the pixel electrode 350.

2-3. Dimming Element

Figure 6:
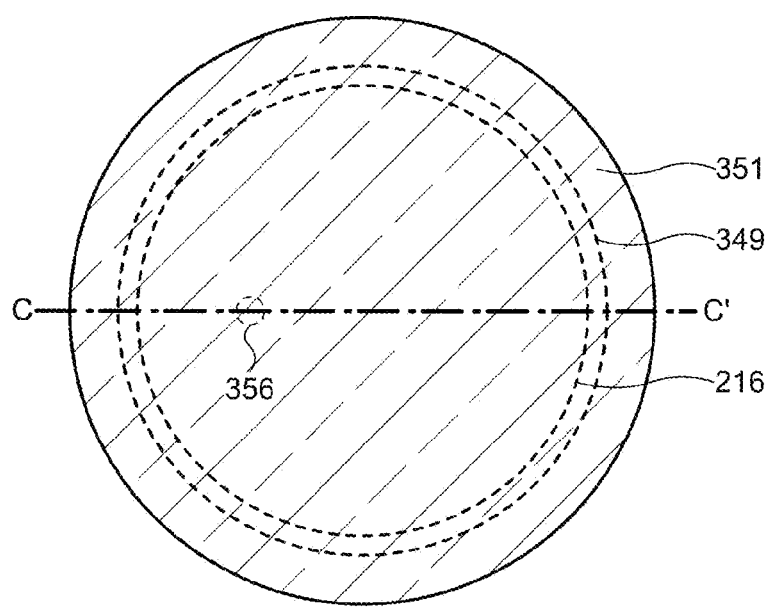
FIG. 6 is a schematic top view of a dimming element of a display device according to an embodiment of the present invention.
Figure 7:
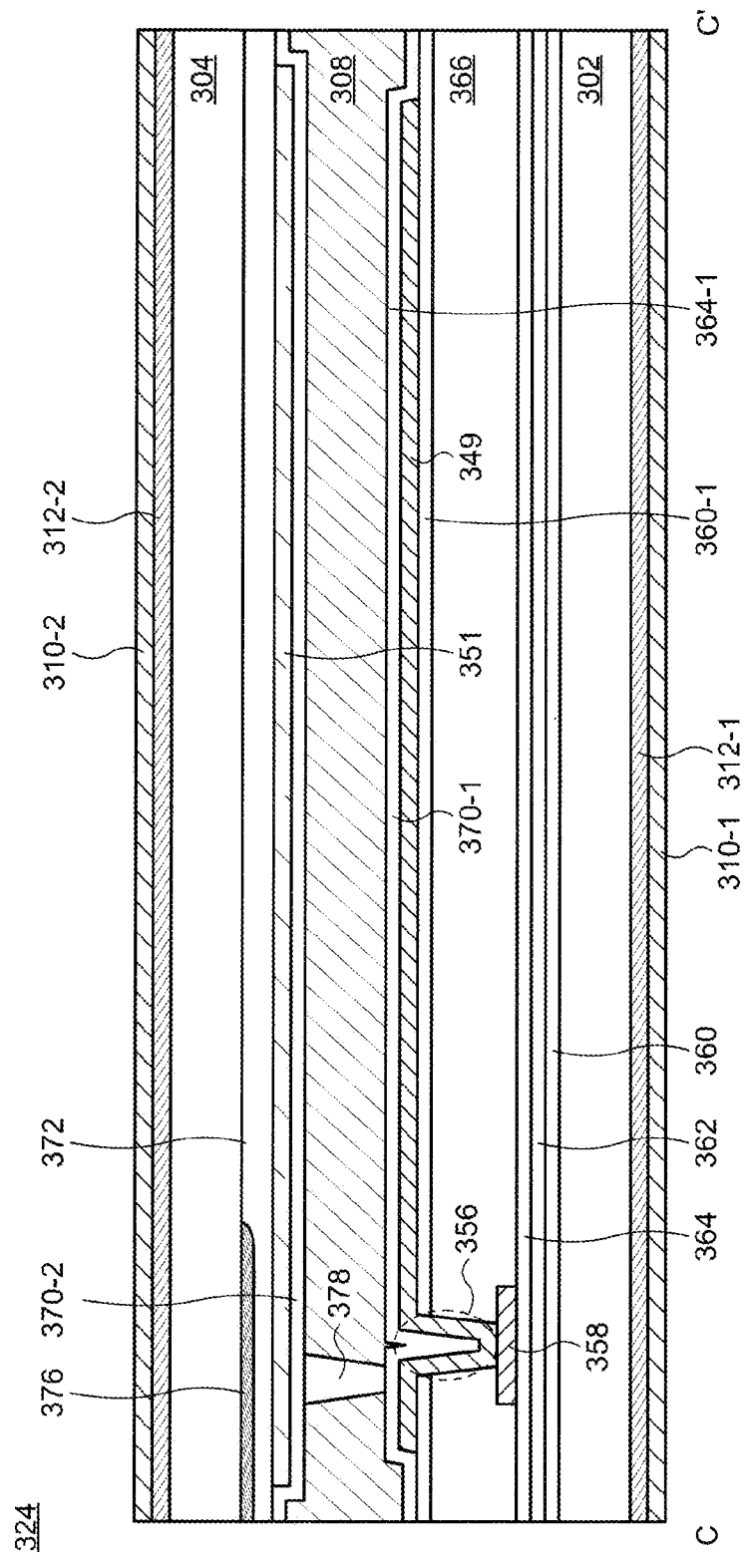
FIG. 7 is a schematic cross-sectional view of a dimming element of a display device according to an embodiment of the present invention.

A top view of the dimming element 324 is shown in FIG. 6, whereas a schematic view of a cross section along a chain line C-C' in FIG. 6 is shown in FIG. 7. As demonstrated in these figures, the pixel circuit of the dimming element 324 includes a lower electrode 349, an upper electrode 351 overlapping with the lower electrode 349, and the liquid crystal layer 308 arranged between the lower electrode 349 and the upper electrode 351. The dimming element 324 is electrically connected to a dimming-controlling line 358 extending from the signal-line driver circuit 328. The dimming-controlling line 358 is provided with a dimming-controlling signal from the signal-line driver circuit 328, and a potential of this signal is supplied to the lower electrode 349 through the dimming-controlling line 358. The lower electrode 349 may be formed so as to cover the whole of the through hole 326 as shown in FIG. 6. Alternatively, although not illustrated, the lower electrode 349 may be formed so as to cover the whole of the light-receiving surface of the photoelectric transducer 400.

Similar to the pixel circuit of the pixel 322, the pixel circuit of the dimming element 324 is also disposed over the array substrate 302 through the undercoat 360. The dimming element 358 is formed over the array substrate 302 via the undercoat 360 as well as the gate insulating film 362 and the interlayer insulating film 364 extending from the pixel 322, over which the leveling film 366 is arranged. An opening 356 reaching the dimming-controlling line 358 is formed in the leveling film 366, and the lower electrode 349 is arranged over the leveling film 366 so as to cover this opening 356, by which the lower electrode 349 and the dimming-controlling line 358 are electrically connected to each other. In the present embodiment, one lower electrode 349 is arranged in one dimming element 324. In other words, one dimming element 324 possesses one liquid crystal element including one lower electrode 349, one upper electrode 351 overlapping with the lower electrode 349, and a part of the liquid crystal layer 308 therebetween.

The lower electrode 349 is covered by the first orientation film 370-1 extending from the pixel 322. Therefore, the first orientation film 370-1 over the lower electrode 349 is shared by the pixel 322, and the orientation treatment direction thereof is the same as that in the pixel 322.

The counter substrate 304 is provided with the upper electrode 351. The upper electrode 351 may be configured so that the same potential (Vcom) as that of the common electrode 348 is supplied or a potential different from that of the common electrode 348 is supplied. When the overcoat 372 is disposed in the pixel 322, the upper electrode 351 is formed over the counter electrode 304 through the overcoat 372. The second orientation film 370-2 extending from the pixel 322 and covering the upper electrode 351 is also formed over the counter substrate 304. Similar to the first orientation film 370-1, this second orientation film 370-2 is also shared by the pixel 322, and the orientation treatment direction thereof is the same as that in the pixel 322. Note that the color filter 374 may not be formed in the dimming element 324. In this case, the overcoat 372 may be in contact with the counter substrate 304 as shown in FIG. 7. The black matrix 376 may be formed in the dimming element 324 so as to overlap with the dimming-controlling line 358, for example. Although not illustrated, similar to the pixels 322, a transistor electrically connected to the lower electrode 349 and the dimming-controlling line 358 may be provided therebetween to supply the dimming-controlling signal to the lower electrode 349 through the transistor.

The liquid crystal layer 308 is arranged between the lower electrode 349 and the upper electrode 351, and the lower electrode 349, the upper electrode 351, the first orientation film 370-1, and the second orientation film 370-2 are sandwiched by the array substrate 302 and the counter substrate 304. As described above, the sealing material 306 forms a single closed shape over the array substrate 302. Hence, the liquid crystal layer 308 is not divided between the dimming element 324 and the pixel 322 and is shared by the dimming element 324 and the pixel 322. In other words, one liquid crystal layer 308 is shared by all of the pixels 322 and the dimming element 324. Similar to the pixel 322, the spacer 378 may be disposed in the dimming element 324 to maintain the distance between the lower electrode 349 and the upper electrode 351.

As described above, the display device 100 possesses the pair of linear polarizing plates 310 and the pair of λ/4 plates 312. The pair of λ/4 plates (a first λ/4 plate 312-1 and a second λ/4 plate 312-2) is respectively arranged under the array substrate 302 and over the counter substrate 304 to sandwich the dimming element 324. The pair of λ/4 plates 312 does not overlap with the pixel 322. In other words, the pixels 322 are exposed from the pair of λ/4 plates 312. The slow axes of the pair of λ/4 plates 312 perpendicularly intersect with each other.

In addition, the pair of linear polarizing plates 310 is respectively disposed under the array substrate 302 and over the counter substrate 304 to sandwich the dimming element 324 and the pair of λ/4 plates 312. Therefore, in the region where the dimming element 324 is formed, the pair of linear polarizing plates 310 and the pair of λ/4 plates 312 overlap with each other, and the latter is sandwiched by the former. Since the pair of linear polarizing plates 310 is arranged so as to overlap with the pixels 322, the pair of linear polarizing plates 310 is shared by the pixel 322 and the dimming element 324. Similar to the pixel 322, the transmission axes of the linear polarizing plates 310 also perpendicularly intersect with each other in the dimming element 324. Moreover, the direction of the transmission axis of the first linear polarizing plate 310-1 is the same between the pixel 322 and the dimming element 324, and the direction of the transmission axis of the second linear polarizing plate 310-2 is also the same between the pixel 322 and the dimming element 324. The slow axes of the pair of λ/4 plates 312 respectively shift from the transmission axes of the pair of linear polarizing plates 310 by 45°.

In the dimming element 324, the initial orientation of the liquid crystal molecules included in the liquid crystal layer 308 is also mainly determined by the orientation treatment directions of the first orientation film 370-1 and the second orientation film 370-2. In the absence of an electric field, the liquid crystal molecules orient along the orientation treatment direction substantially parallel to the surface of the array substrate 302. Since the orientation treatment directions of the orientation films 370 are the same as each other between the pixel 322 and the dimming element 324, the orientation direction of the liquid crystal molecules is also the same as each other. When a potential difference is provided between the lower electrode 349 and the upper electrode 351, this initial orientation varies. That is, the electric field generated between the lower electrode 349 and the upper electrode 351 and substantially perpendicular to the surface of the array substrate 302 causes the liquid crystal molecules to be raised (tilted) from the surface of the array substrate 302 so as to diagonally or perpendicularly orient from the surface. The control of this change in orientation state with the potential difference between the lower electrode 349 and the upper electrode 351 enables the control of the light transmissivity of the liquid crystal layer 308. Accordingly, an ECB (Electrically Controlled Birefringence) liquid crystal element is formed in the dimming element 324. Hence, the display device 100 possesses two kinds of liquid crystal element different in operation mode.

3. Operation

Figure 8A:
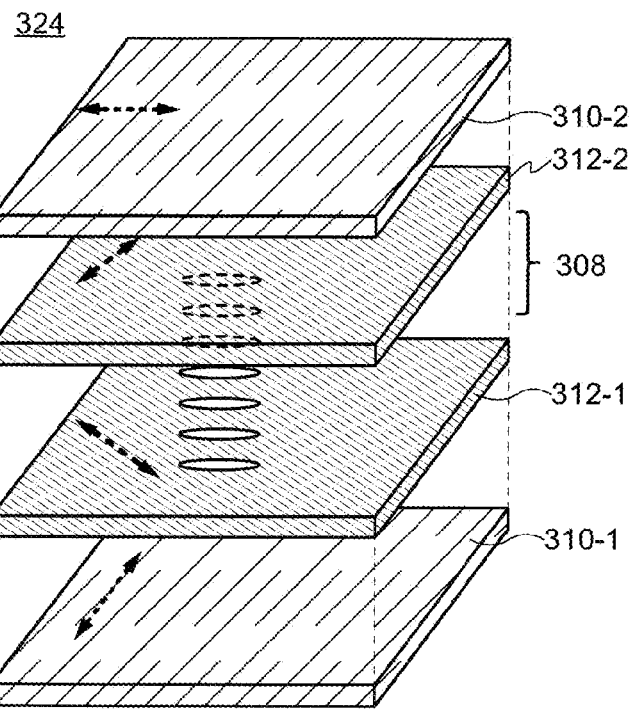
FIG. 8A and FIG. 8B are schematic perspective views for explaining the operation of a display device according to an embodiment of the present invention.
Figure 8B:
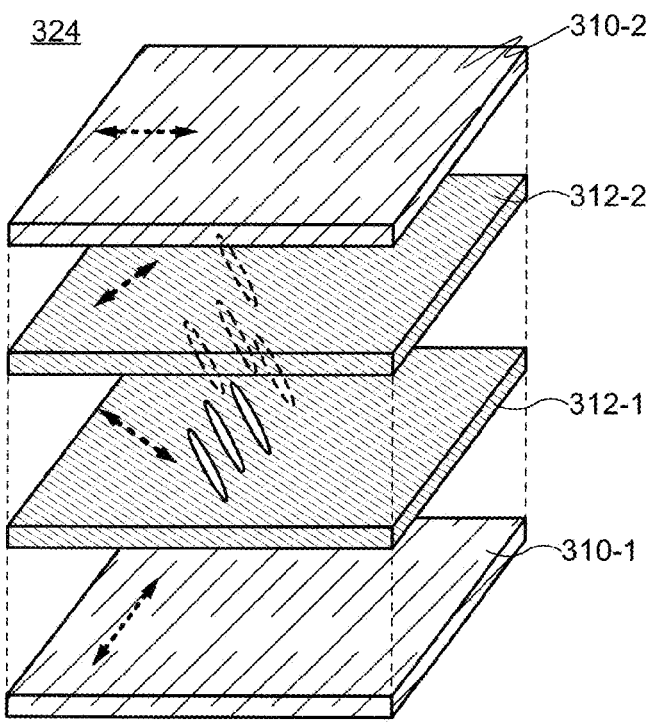
Figure 9A:
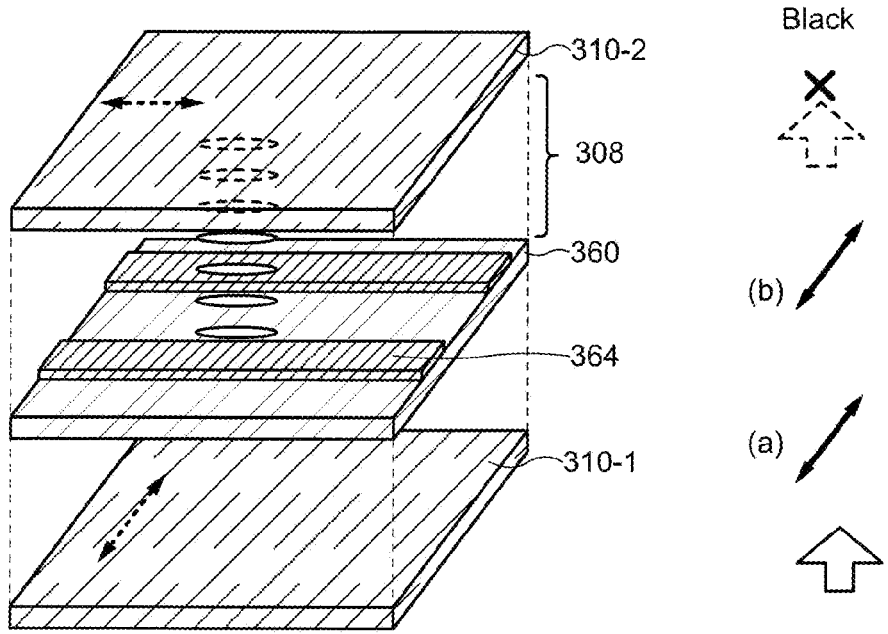
FIG. 9A and FIG. 9B are schematic perspective views for explaining the operation of a display device according to an embodiment of the present invention.
Figure 9B:
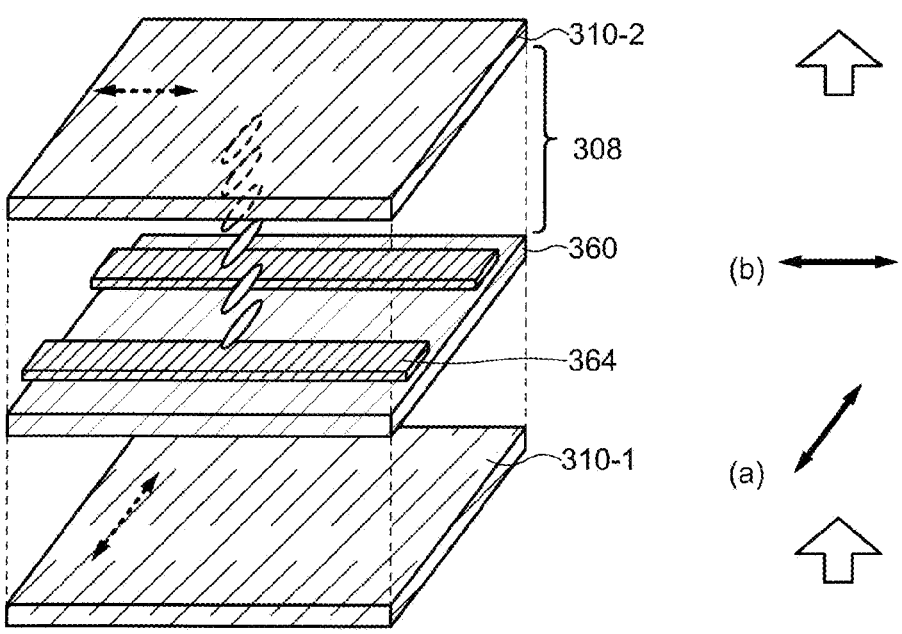

Operation of the dimming element 324 is explained using FIG. 8A and FIG. 8B, whereas operation of the pixel 322 is explained using FIG. 9A and FIG. 9B. For visibility, the upper electrode 351 and the lower electrode 349 in the dimming element 324 are not illustrated in these figures. Although the linear polarizing plates 310 and the λ/4 plates 312 are separately illustrated, this is merely for convenience of explanation, and these items may be in contact with each other. The dotted arrows shown over the linear polarizing plates 310 and the λ/4 plates 312 respectively express the transmission axis and the slow axis thereof, and the solid arrows express the polarizing direction of the light.

3-1. Dimming Element (1) Initial State

A schematic perspective view of the dimming element 324 in the initial state, i.e., in an off state, is shown in FIG. 8A. In this state, the orientation of the liquid crystal molecules illustrated as ellipses is determined by the orientation treatment directions of the first orientation film 370-1 and the second orientation film 370-2. Since the orientation treatment directions of the first orientation film 370-1 and the second orientation film 370-2 are the same as each other, the liquid crystal molecules substantially orient along the orientation treatment direction in the absence of an electric field.

Here, a case is considered where the light proceeds from the array substrate 302 side (i.e., the side of the first linear polarizing plate 310-1) toward the counter electrode 304 side (i.e., the side of the second linear polarizing plate 310-2). This light indicated by the hollow arrow becomes linearly polarized light (a) when passing through the first linear polarizing plate 310-1. When this linearly polarized light (a) next enters into the first λ/4 plate 312-1, the phase shifts by π/2 because the slow axis of the first λ/4 plate 312-1 shifts from the transmission axis of the first linear polarizing plate 310-1 by 45°. As a result, the light becomes circularly polarized light (b) when passing through the first λ/4 plate 312-1. When this circularly polarized light (b) passes through the liquid crystal layer 308, this light becomes inverted circularly polarized light (c) because the phase is π-retarded due to the anisotropy of the refractive index of the liquid crystal molecules included in the liquid crystal layer 308. When this circularly polarized light (c) further enters into the second λ/4 plate 312-2, this light is −π/2-retarded because the first λ/4 plate 312-1 and the second k/4 plate 312-2 are in an orthogonal relationship. As a result, the phase difference from the light incident on the first λ/4 plate 312-1 becomes n, and therefore, the circularly polarized light (c) becomes linearly polarized light (d). The polarizing axis at this time perpendicularly intersects with that of the polarized light (a) formed by the first linear polarizing plate 310-1. Since the first linear polarizing plate 310-1 and the second linear polarizing plate 310-2 are in the cross Nichol relationship with each other, the linearly polarized light (d) generated when passing through the second λ/4 plate 312-2 is capable of passing through the second linear polarizing plate 310-2. The same is applied when the outside light proceeds from the counter substrate 304 side to the array substrate 302 side. Thus, the outside light is capable of passing through the first linear polarizing plate 310-1. Hence, the light can pass through the dimming element 324, and the dimming element 324 functions as the so-called normally white element.

(2) Operation

A schematic perspective view of the dimming element 324 in the case where a potential difference is provided between the lower electrode 349 and the upper electrode 351, that is, in an on state, is illustrated in FIG. 8B. When this potential difference exceeds the threshold voltage, the liquid crystal molecules gradually rise from the surface of the array substrate 302, and the tilt angle thereof increases with increasing potential difference. Thus, the birefringence decreases with respect to the light incident on the liquid crystal molecules. When the birefringence is 0, the circularly polarized light (b) generated when passing through the first λ/4 plate 312-1 enters the second linear polarizing plate 310-2 while maintaining its polarization property. Although this circularly polarized light (c) is converted into the linearly polarized light (d) by the second linear polarizing plate 310-2, the polarizing axis at this time is the same as the polarizing axis of the linearly polarizing light (a) formed by the first linear polarizing plate 310-1 and perpendicularly intersects with the transmission axis of the second linear polarizing plate 310-2. Therefore, the light incident on the first linear polarizing plate 310-1 cannot pass through the dimming element 324. The behavior of the outside light incident on the second linear polarizing plate 310-2 is also the same and cannot pass through the first linear polarizing plate 310-1.

The birefringence of the liquid crystal molecules with respect to the light incident on the liquid crystal molecules is controlled by the tilt angle of the liquid crystal molecules, and the tilt angle is determined by the potential difference provided between the upper electrode 351 and the lower electrode 349. Therefore, the control of this potential difference using the dimming-controlling signal enables the transmissivity of the dimming element 324 to be adjusted.

As described above, the through hole 216 formed in the light-guiding plate 204 and the reflecting plate 202 is locate in the region where the dimming element 324 is provided. Hence, when the dimming element 324 is in an off state (i.e., normally white), the outside light is capable of passing through the dimming element 324, which enables sensing of the outside light, capturing an image, and the like by utilizing the photoelectric transducer 400 arranged in or under the through hole 216. On the other hand, it is possible to adjust the transmissivity of the dimming element 324 by driving the dimming element 324 while controlling the potential difference between the upper electrode 351 and the lower electrode 349, which allows the dimming element 324 to function as a neutral density (ND) filter or a shutter. When the dimming element 324 functions as a shutter, the outside light reflected by the photoelectric transducer 400 can be shielded. Thus, it is possible to exclude an adverse influence on the display produced by the pixels 322 as described below.

In addition, it is not necessary to form a slit or a cutoff in the lower electrode 349 in the dimming element 324 of the display device 100, and the lower electrode 349 has the same thickness in almost all of the dimming element 324. Moreover, the lower electrode 349 is arranged to cover the whole of the through hole 216 or all of the light-receiving surface of the photoelectric transducer 400 as described above. Therefore, it is possible to avoid the generation of a refractive index distribution caused by a slit or a cutoff, and no adverse influence is provided to the outside light incident on the dimming element 324. Accordingly, when an image-capturing element is used as the photoelectric transducer 400, no adverse influence such as generation of a fringe or unevenness is exerted on the captured image, and a high-quality image can be obtained.

3-2. Pixel (1) Initial State

A schematic perspective view of the pixel 322 in the off state is shown in FIG. 9A. Similar to the dimming element 324, the orientation of the liquid crystal molecules is determined by the orientation characteristics of the first orientation film 370-1 and the second orientation film 370-2. Since the orientation treatment directions of the first orientation film 370-1 and the second orientation film 370-2 are the same as each other, the liquid crystal molecules substantially orient along the orientation treatment direction in the absence of an electric field.

Here, a case is considered where the light from the backlight unit 200 is incident on the side of the first linear polarizing plate 310-1 and proceeds toward the side of the second linear polarizing plate 310-2. The light derived from the backlight unit 200 and indicated by the hollow arrow becomes linearly polarized light (a) parallel to the transmitting axis when passing through the first linear polarizing plate 310-1. Since no λ/4 plate 312 is provided in the pixel 322, this linearly polarized light (a) is next incident on the liquid crystal layer 308. When the orientation treatment is performed on the orientation films 370 so that the orientation treatment directions perpendicularly intersect with the transmission axis of the first linear polarizing plate 310-1, the polarizing axis of the linearly polarized light (a) almost perpendicularly intersect with the orientation direction of the liquid crystal molecules. Hence, no birefringence appears, and no phase retardation of the light occurs. As a result, the linearly polarized light (a) enters the second linear polarizing plate 310-2 while maintaining its polarizing axis and intensity. However, since the transmission axis of the second linear polarizing plate 310-2 perpendicularly intersects with the polarizing axis of the linear polarizing plate 310-1, the light incident on the second linear polarizing plate 310-2 (b) is absorbed by the second linear polarizing plate 310-2 and does not radiate from the pixel 322. Therefore, the pixel 322 is in the so-called normally off state in the off state.

(2) Operation

A schematic perspective view of the pixel 322 in the case where a potential difference is provided between the pixel electrode 350 and the common electrode 348, that is in an on state, is illustrated in FIG. 9B. This potential difference generates an electric field substantially parallel to the surface of the array substrate 302, and the liquid crystal molecules rotate in the plane parallel to the surface of the array substrate 302 due to the dielectric anisotropy of the liquid crystal molecules. Hence, the polarizing axis of the linearly polarized light (a) incident on the liquid crystal layer 308 and the orientation direction of the liquid crystal molecules shift from each other, and the phase retardation of the light incident on the liquid crystal layer 308 occurs. Here, the thickness of the liquid crystal layer 308 is controlled according to the refractive indexes of the liquid crystal molecules in the long axis direction and the short axis direction so that the phase retardation is approximately π in the display device 100. Therefore, the light which has passed through the liquid crystal layer becomes the linearly polarized light (b) obtained by rotating the polarizing axis of the linearly polarized light (a). When the orientation of the liquid crystal molecules rotates by 90°, the polarizing axis of this linearly polarized light (b) perpendicularly intersects with the polarizing axis of the linearly polarized light (a). In addition, the first linear polarizing plate 310-1 and the second linear polarizing plate 310-2 are in the cross Nichol relationship. Thus, the linearly polarized light radiating from the liquid crystal layer 308 is capable of passing through the second linear polarizing plate 310-2.

The amount of the extracted light depends on the rotation angle of the liquid crystal molecules, and the rotation angle can be controlled by the potential difference between the pixel electrode 350 and the common electrode 348 based on the potential of the image signal. Hence, gradation can be obtained in each pixel 322 by controlling this potential difference. Moreover, since the color filter 374 with a different optical property is formed in every pixel as described above, it is possible to control the gradation for every color, which enables full-color display on the display region 320.

As described above, since the pixel 322 disposed in the display region 320 is normally off in the display device 100, display having a high contrast can be realized. Furthermore, an FFS liquid crystal element is formed in the pixel 322, it is possible to perform display with excellent viewing-angle characteristics. Therefore, high-quality full-color display is attainable by the display device 100.

Moreover, the dimming element 324 is arranged so as to be surrounded by the pixels 322, and the photoelectric transducer 400 such as an image-capturing element can be disposed so as to overlap with the display region 320. Therefore, the photoelectric transducer 400 is not required to be arranged in the frame region, which allows the frame region to be reduced or excluded and an area of the display region 320 relative to the whole of the display device to be increased. As a result, an electric apparatus with a large display region 320 and excellent designability can be provided. In addition, it is also possible to control the light transmissivity of the dimming element 324, the amount of the light incident on the photoelectric transducer 400 can be appropriately adjusted without decreasing display quality caused by the dimming element 324.

4. Modified Example

Figure 10A:
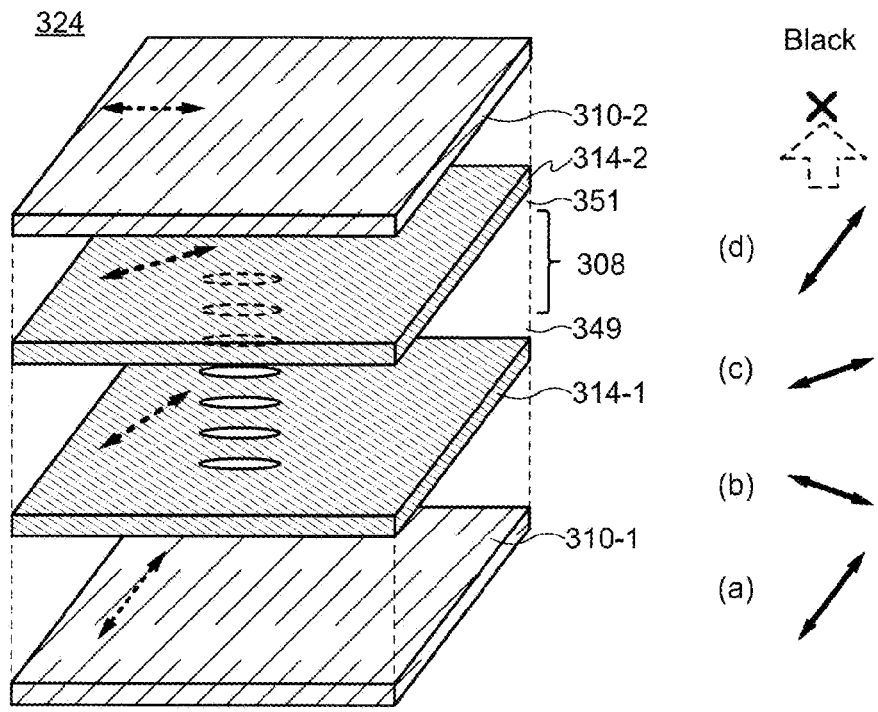
FIG. 10A and FIG. 10B are schematic perspective views for explaining the operation of a display device according to an embodiment of the present invention.
Figure 10B:
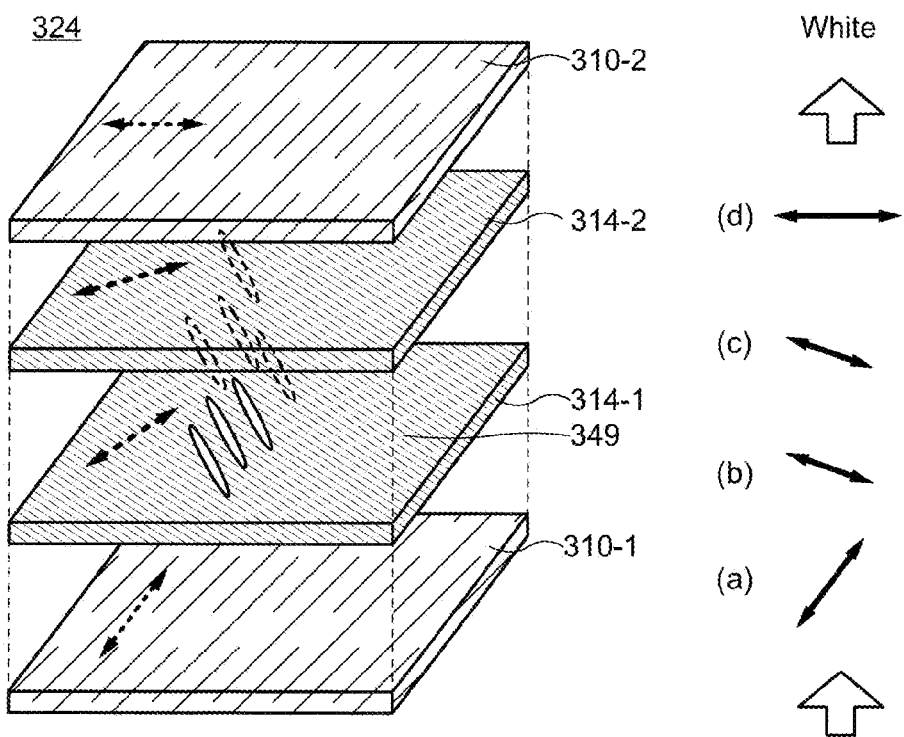

The display device 100 may possess a pair of halfwave plates (hereinafter, referred to as a λ/2 plate) 314 instead of the pair of λ/4 plates 312. The structure and operation in this case are explained using FIG. 10A and FIG. 10B. FIG. 10A and FIG. 10B are respectively schematic perspective views of the display device 100 in the initial state and in operation and respectively correspond to FIG. 8A and FIG. 8B.

The pair of λ/2 plates 314 is disposed so as to sandwich the dimming element 324 and is sandwiched by the pair of linear polarizing plates 310. The pair of λ/2 plates 314 is arranged so that the slow axis of the λ/2 plate (first λ/2 plate 314-1) arranged on the side of the array substrate 302 shifts from that of the first linear polarizing plate 310-1 by 22.5°, and, in a similar way, the λ/2 plate (second λ/2 plate 314-2) arranged on the side of the counter substrate 304 shifts from that of the second linear polarizing plate 310-2 by 22.5°. Hence, the slow axes of the λ/2 plates 314 are in an orthogonal relationship, and the pair of linear polarizing plates 310 is also in the cross Nichol relationship.

(1) Initial State

Similar to the case using the pair of λ/4 plates 312 (FIG. 8A), the liquid crystal molecules substantially orient along the orientation treatment direction in the off state (FIG. 10A). The light proceeding from the side of the linear polarizing plate 310-1 becomes linearly polarizing light (a) when passing through the first linear polarizing plate 310-1. The phase π-shifts when this linearly polarized light (a) next enters the first λ/2 plate 314-1. However, since the slow axis of the first λ/2 plate 314-1 shifts from the transmission axis of the first linear polarizing plate 310-1 by 22.5°, the polarizing axis of the linearly polarized light (a) which has passed through the first λ/2 plate 314-1 shifts by π/2 from the transmission axis of the first linear polarizing plate 310-1, that is, by 45° from the transmission axis of the first linear polarizing plate 310-1, and the linear polarizing light (a) becomes linearly polarized light (b). When this linearly polarized light (b) passes through the liquid crystal layer 308, further phase retardation occurs. Here, the thickness of the liquid crystal layer 308 is controlled according to the refractive indexes of the liquid crystal molecules in the long axis direction and the short axis direction so that the phase retardation is approximately Tr in the display device 100. Hence, the polarizing axis further shifts by 90°, and the linearly polarized light (b) becomes linearly polarizing light (c) when the linearly polarized light (b) passes through the liquid crystal layer 308. When this linearly polarizing light (c) further enters the second λ/2 plate 314-2, a π phase difference arises. However, since the slow axis of the second λ/2 plate 314-2 shifts from the transmission axis of the second linear polarizing plate 310-2 by an angle of 25.5°, a π/2 phase difference is provided. As a result, the polarizing axis shifts by 45°, and the linearly polarized light (c) becomes linearly polarized light (d) having a polarizing axis perpendicularly intersecting with the transmission axis of the first linear polarizing plate 310-1. This polarizing axis perpendicularly intersects with the transmission axis of the second linear polarizing plate 310-2, and the light cannot pass through the second linear polarizing plate 310-2. Thus, the dimming element 324 is in the so-called normally black state in the off state.

(2) Operation

When the potential difference provided between the lower electrode 349 and the upper electrode 351 exceeds the threshold voltage, the liquid crystal molecules gradually rise from the surface of the array substrate 302, and the tilt angle thereof increases with increasing potential difference. Thus, the birefringence decreases with respect to the light incident on the liquid crystal molecules. When the birefringence is 0, the polarization property of the linearly polarized light (b) generated when passing through the first λ/2 plate 314-1 is maintained, and the linearly polarized light (c) is incident on the second λ/2 plate 314-2. This linearly polarized light (c) is converted into linearly polarized light (d) by the second λ/2 plate 314-2. However, since the slow axis of the second λ/2 plate 314-2 shifts from the transmission axis of the second linear polarizing plate 310-2 by 22.5°, the polarizing axis thereof is the same as the transmission axis of the linear polarizing plate 310-2. Therefore, this linearly polarized light (d) is capable of passing through the second linear polarizing plate 310-2. Similarly, the behavior of the light incident from the second linearly polarizing plate 310-2 is able to pass through the first linear polarizing plate 310-1.

The birefringence of the liquid crystal molecules with respect to the light incident on the liquid crystal molecules is controlled by the tilt angle of the liquid crystal molecules, and the tilt angle is determined by the potential difference provided between the upper electrode 351 and the lower electrode 349. Therefore, the control of this potential difference using the dimming-controlling signal enables the transmissivity of the dimming element 324 to be adjusted. For example, when the dimming element 324 is in an off state (i.e., in a normally black state), the light reflected by the photoelectric transducer 400 can be shielded because the outside light cannot pass through the dimming element 324, which prevents an adverse influence on the display produced by the pixels 322. In addition, the transmissivity of the dimming element 324 can be adjusted by operating the dimming element 324 with a controlled potential difference between the upper electrode 315 and the lower electrode 349, which allows the dimming element 324 to function as an ND filter or a shutter. Hence, it is possible to optimize the amount of the light incident on the photoelectric transducer 400 by appropriately controlling the potential difference between the upper electrode 351 and the lower electrode 349 depending on the external environment. Moreover, since the single number of the lower electrode 349 is arranged so as to cover the whole of the through hole 216 or all of the light-receiving surface of the photoelectric transducer 400, it is possible to avoid generation of a refractive-index distribution. Hence, no adverse influence is exerted on the outside light incident on the dimming element 324, and a high-quality image can be obtained without any adverse influence such as generation of a fringe or unevenness on the image captured by the photoelectric transducer 400.

Second Embodiment

In the present embodiment, a modified example of the dimming element 324 shown in the First Embodiment is demonstrated. An explanation of the structure the same as or similar to those described in the First Embodiment may be omitted.

Figure 11A:
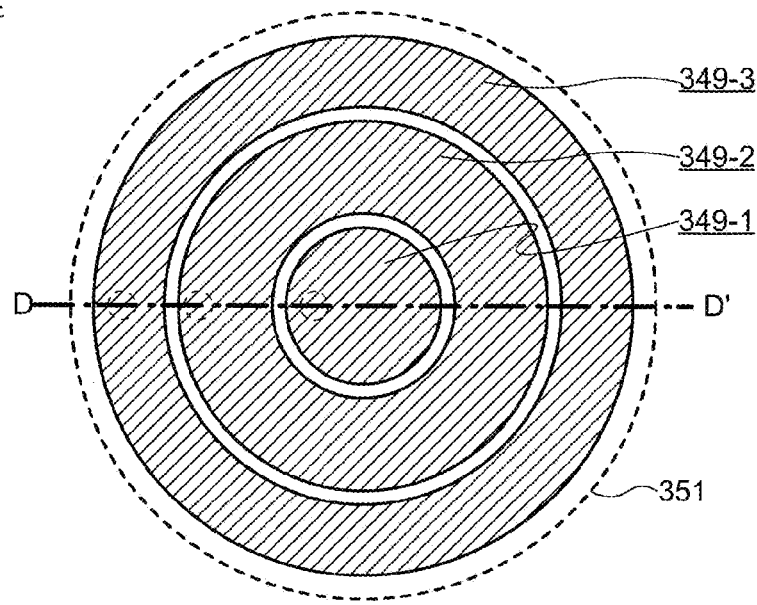
FIG. 11A and FIG. 11B are respectively schematic top and cross-sectional views of a dimming element of a display device according to an embodiment of the present invention.
Figure 11B:
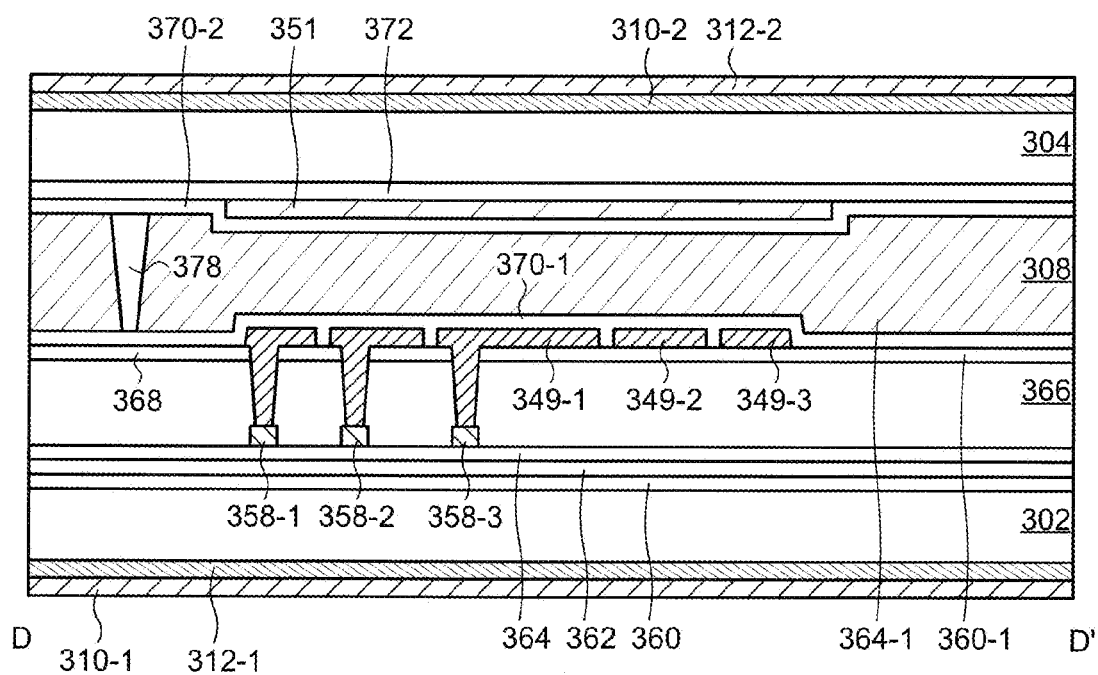

A schematic top view of the dimming element 324 of the present embodiment is shown in FIG. 11A, whereas a schematic view of a cross section along a chain line D-D' in FIG. 11A is shown in FIG. 11B. As shown in these figures, the dimming element 324 of the present embodiment is divided into a plurality of regions (e.g., a first region 349-1, a second region 349-2, and a third region 349-3) electrically independent from one another. In the structure shown in FIG. 11A, the number of these regions is three. However, there is no limitation to the number of the regions. The plurality of regions is electrically connected to the respective dimming-controlling lines 358 (e.g., a first dimming-controlling line 358-1, a second dimming-controlling line 358-2, and a third dimming-controlling line 358-3) independently controlled from one another. On the other hand, the upper electrode 351 may be arranged so as to overlap with the plurality of regions. Therefore, one dimming element 324 includes a plurality of liquid crystal elements in the present embodiment.

The shape and the arrangement of the plurality of regions are not limited, and the outer circumference of each region may be configured to be a circle or a part of a circle while one region is surrounded by another region as shown in FIG. 11A and FIG. 11B. In this case, a k-th region selected from first to n-th regions is surrounded by a (k+1)-th region where the total number of the regions is n, the innermost region is the first region, and an outermost region is the n-th region. Here, n is a natural number larger than 1, and k is a natural number equal to 1 and less than n. For example, the innermost first region 349-1 is surrounded by the second region 349-2, whereas the second region 349-2 is surrounded by the third region 349-3.

Such a structure allows the transmissivity of the liquid crystal element to be controlled in every plural region in the dimming element 324, which enables more precise control of the light transmissivity of the dimming element 324. Hence, the dimming element 324 can be used as an ND filter or a shutter having more precisely controlled transmissivity.

Figure 12A:
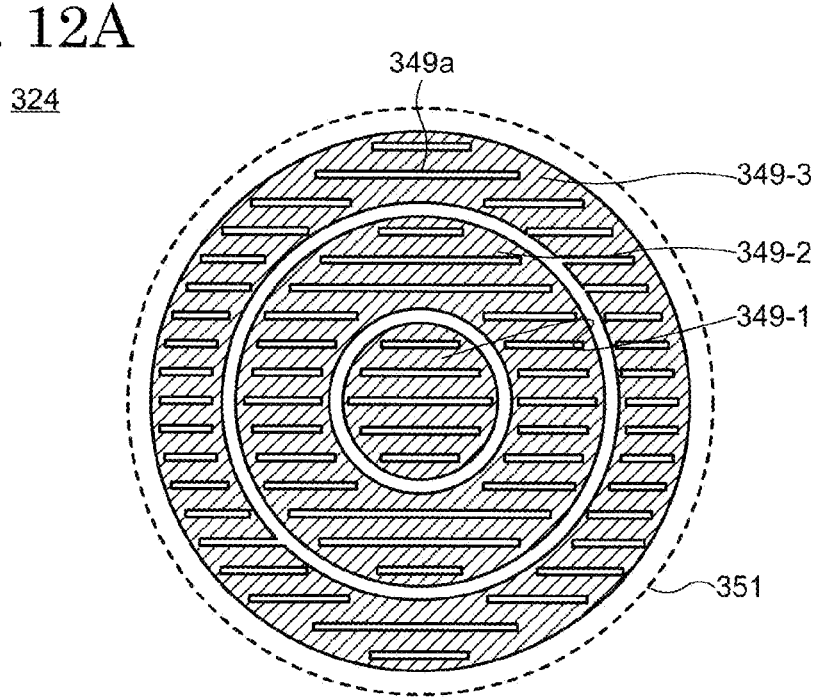
FIG. 12A and FIG. 12B are schematic top views of a dimming element of a display device according to an embodiment of the present invention.

In addition, a plurality of slits 349a arranged in a stripe form may be provided in each region as shown in FIG. 12A.

Figure 12B:
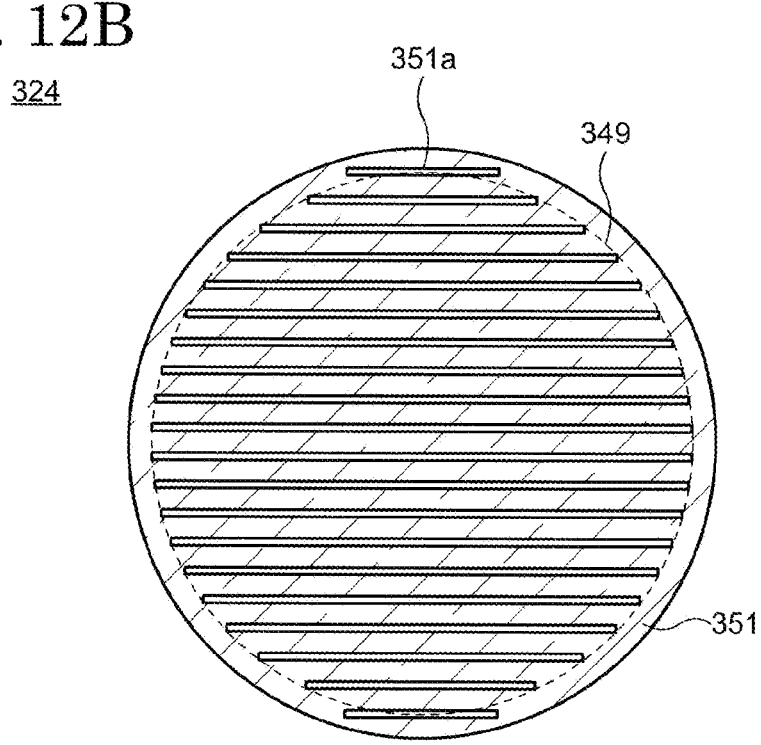

In a similar way, a plurality of slits 351a arranged in a stripe form may be formed in the upper electrode 351 as shown in FIG. 12B. An enlarged schematic top view of the case where the slits 349a and 351a are respectively provided to the lower electrode 349 and the upper electrode 351 is shown in FIG. 13A, and a schematic view of a cross section along a chain line E-E' in FIG. 13A is shown in FIG. 13B.

Figure 13A:
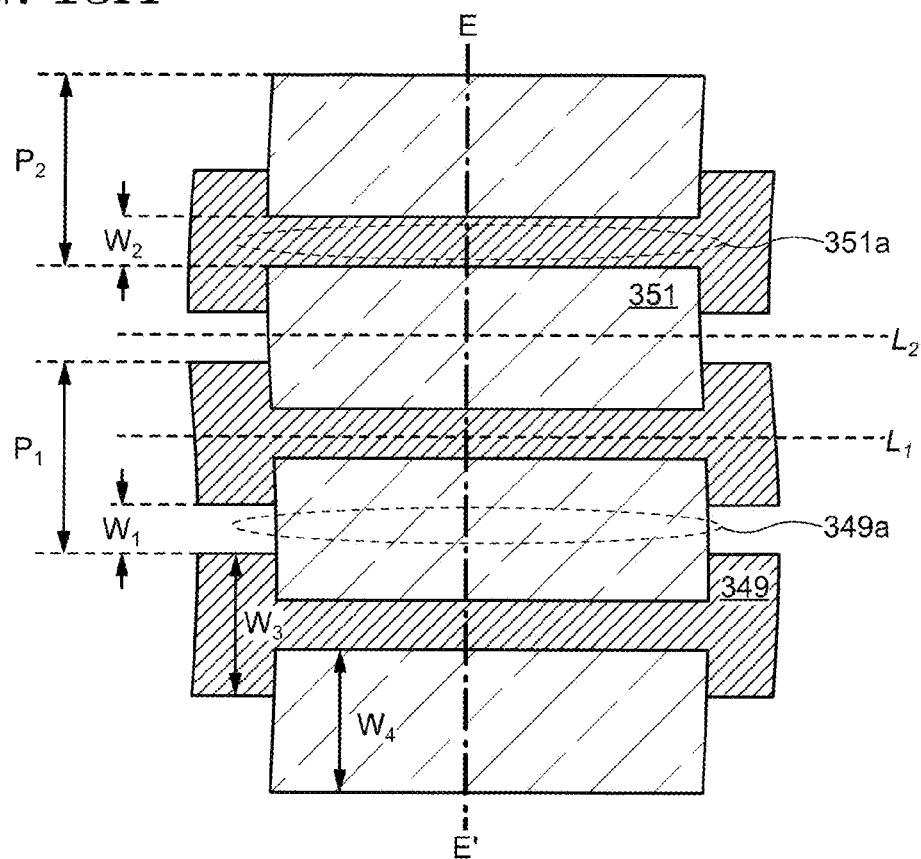
FIG. 13A and FIG. 13B are respectively schematic cross-sectional and top views of a dimming element of a display device according to an embodiment of the present invention.
Figure 13B:
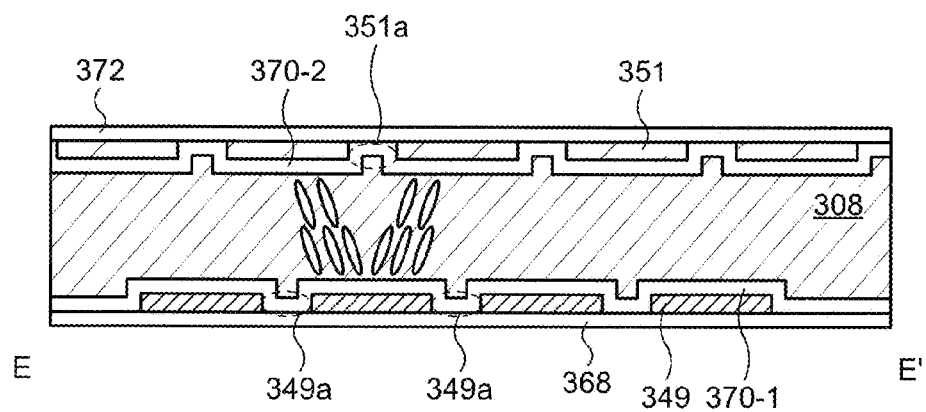

As shown in FIG. 13A, a width $W_1$ of the slit 349a is preferred to be the same as or substantially the same as a width $W_2$ of the slit 351a. Specifically, the widths $W_1$ and $W_2$ are equal to or more than 2 µm and equal to or less than 20 µm and typically 10 µm. On the other hand, a width $W_3$ of a region between adjacent slits 349a is preferred to be the same as or substantially the same as a width $W_4$ of a region between adjacent slits 351a. Specifically, the widths $W_3$ and $W_4$ are equal to or more than 200 µm and equal to or less than 600 µm and typically 400 µm. Furthermore, the slits 349a and the slits 351a are provided so that a pitch $P_1$ of the slits 349a and a pitch $P_2$ of the slits 351a are the same as each other.

The upper electrode 351 and the lower electrode 349 are arranged so that slit 349a overlaps with the region between two adjacent slits 351a, and the slit 351a similarly overlaps with the region between two adjacent slits 349a. Here, it is preferred that a linear line $L_1$ passing through a center of the region between the adjacent slits 349a and extends in a plane parallel to the surface of the array substrate 302 pass through a center of the slit 351a when the display device 100 is viewed from above. In a similar way, it is preferred that a linear line $L_2$ passing through a center of the region between the adjacent slits 351a and extends in a plane parallel to the surface of the array substrate 302 pass through a center of the slit 349a.

In the dimming element 324, the initial orientation of the liquid crystal molecules is the same as that in the pixel 322 and is substantially parallel to the surface of the array substrate 302. Application of a potential difference between the upper electrode 351 and the lower electrode 349 causes the liquid crystal molecules to rise from the plane parallel to the array substrate 302. However, when the pre-tilt angle of the liquid crystal molecules is extremely small in an off state, the rising direction varies, which may result in regions (domains) different in the rising direction. If the domains are randomly formed, the viewing angle characteristics and uniformity of the transmissivity in the dimming element 324 are influenced. However, the use of the lower electrode 349 and the upper electrode 351 having the aforementioned structures and arrangements causes the electric field generated therebetween to be tilted from a normal line of the array substrate 302, by which the rising direction can be controlled. For example, when focus is placed on one region between the adjacent slits 349a, the liquid crystal molecules on the right side of the slit 351a in the drawing (the liquid crystal molecules overlapping with the region between one of the adjacent slits 349a and the slit 351a) rises in substantially a single direction, while the liquid crystal molecules on the left side (the liquid crystal molecules overlapping with the region between the other of the adjacent slits 349a and the slit 351a) rises in a substantially reverse direction as shown in FIG. 13B. Therefore, the domain size is decreased, and the distribution thereof is suppressed. As a result, it is possible to prevent deterioration or in-plane unevenness of the viewing angle dependence of the transmissivity.

Third Embodiment

In the present embodiment, a modified example of the dimming element 324 described in the First and Second Embodiments is demonstrated. An explanation of the structure the same as or similar to those described in the First and Second Embodiments may be omitted.

Figure 14:
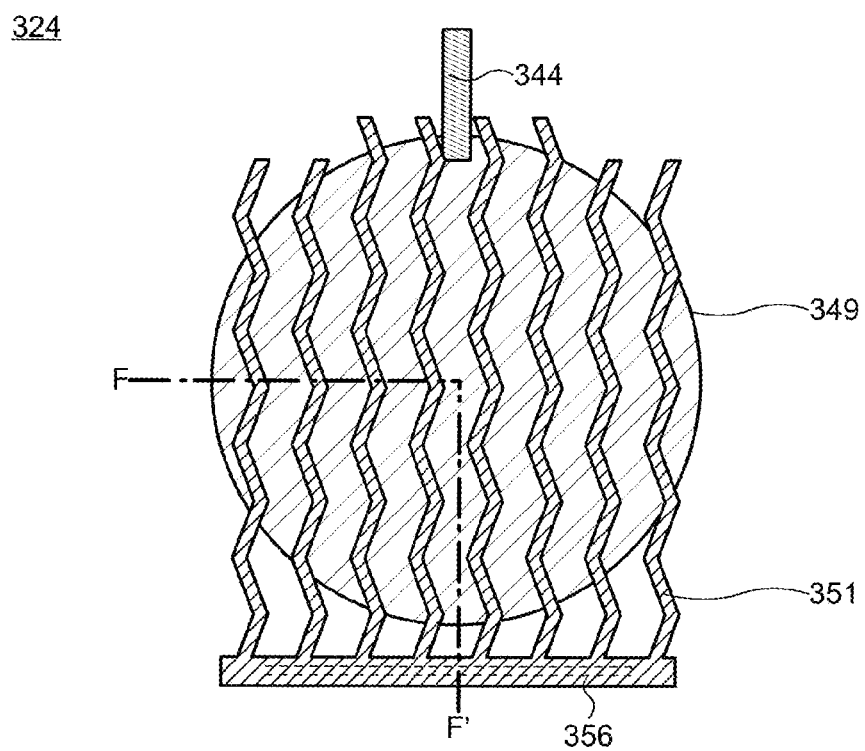
FIG. 14 is a schematic top view of a dimming element of a display device according to an embodiment of the present invention.
Figure 15:
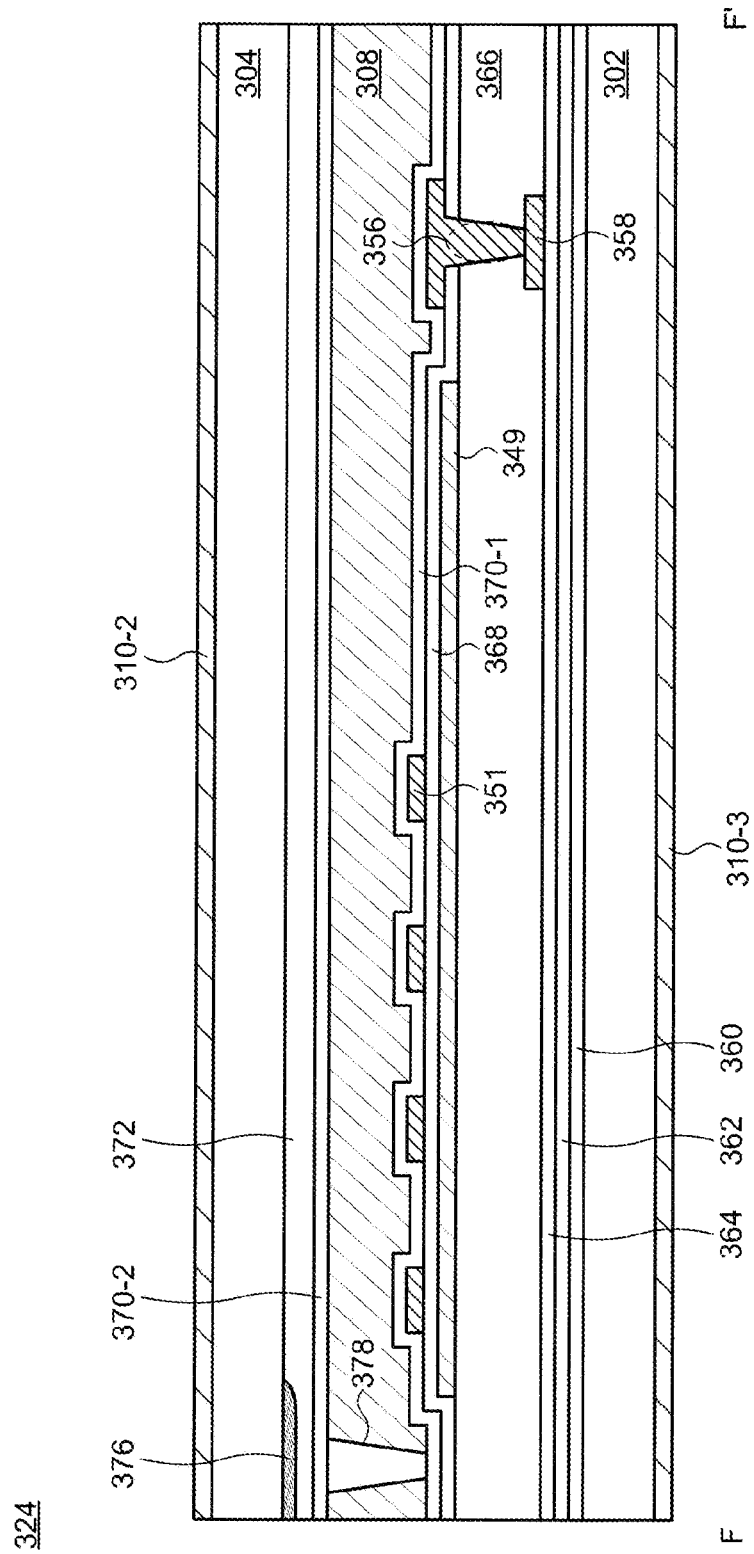
FIG. 15 is a schematic cross-sectional view of a dimming element of a display device according to an embodiment of the present invention.

A schematic top view of the dimming element 324 of the present embodiment is shown in FIG. 14, and a schematic view of a cross section along a chain line F-F' in FIG. 14 is shown in FIG. 15. The dimming element 324 of the present embodiment is different from the dimming element 324 of the First Embodiment in that an FFS liquid crystal element is formed. Specifically, the interelectrode insulating film 368 is provided over the lower electrode 349 over which the upper electrode 351 is formed in the dimming element 324 of the present embodiment as shown in FIG. 14 and FIG. 15. The upper electrode 351 possesses a comb-teeth shape having a plurality of cutoffs and is connected to the dimming-controlling line 358 through the opening 356 formed in the leveling film 366 and the interelectrode insulating film 368. Hence, a part of the lower electrode 349 is exposed from the upper electrode 351. The power-source line 344 is connected to the lower electrode 349 by which the potential (Vcom) the same as that of the common electrode 348 disposed in the pixels 322 can be supplied.

The first orientation film 370-1 is arranged so as to cover the lower electrode 349 and the upper electrode 351, and the liquid crystal layer 308 is arranged so as to be sandwiched by the first orientation film 370-1 and the second orientation film 370-2 and cover the lower electrode 349 and the upper electrode 351. The orientation treatment directions of the first orientation film 370-1 and the second orientation film 370-2 are the same as each other and also the same as the orientation treatment directions of the first orientation film 370-1 and the second orientation film 370-2 in the pixel 322. The liquid crystal molecules are rotated by the electric field generated by the potential difference between the lower electrode 349 and the upper electrode 351 and parallel to the surface of the array substrate 302, thereby controlling the transmissivity of the dimming element 324.

In the dimming element 324 of the present embodiment, no $\lambda/4$ plate nor $\lambda/2$ plate is provided. Instead, a third linear polarizing plate 310-3 under the array substrate 302 and a second linear polarizing plate 310-2 over the counter substrate 304 are provided so as to sandwich the array substrate 302, the counter electrode 304, and the dimming element 324. A transmission axis of the third linear polarizing plate 310-3 perpendicularly intersects with the transmission axis of the first linear polarizing plate 310-1 provided in the pixel 322. On the other hand, the second linear polarizing plate 310-2 is the same as the second linear polarizing plate 310-2 disposed in the pixel 322. In other words, the second linear polarizing plate 310-2 disposed in the pixel 322 and the second linear polarizing plate 310-2 disposed over the dimming element 324 are integrated into a single polarizing plate shared by the pixel 322 and the dimming element 324. Hence, the transmission axis of the second linear polarizing plate 310-2 is the same between the pixel 322 and the dimming element 324, and the third linear polarizing plate 310-3 and the second linear polarizing plate 310-2 are in the parallel Nichol relationship to each other.

Note that, although not illustrated, the first linear polarizing plate 310-1 integrated with the first linear polarizing plate 310-1 provided in the pixel 322 may be arranged under the array substrate 302, the second linear polarizing plate 310-2 may be arranged so as not to overlap with the dimming element 324, and the third linear polarizing plate 310-3 may be arranged over the counter electrode 304 so as to overlap with the dimming element 324. In this case, the first linear polarizing plate 310-1 is shared by the pixel 322 and the dimming element 324, and the transmission axes thereof is the same therebetween. On the other hand, the second linear polarizing plate 310-2 and the third linear polarizing plate 310-3 are in a relationship in which the transmission axes are different from each other by 90° between the pixels 322 and the dimming element 324.

Figure 16:
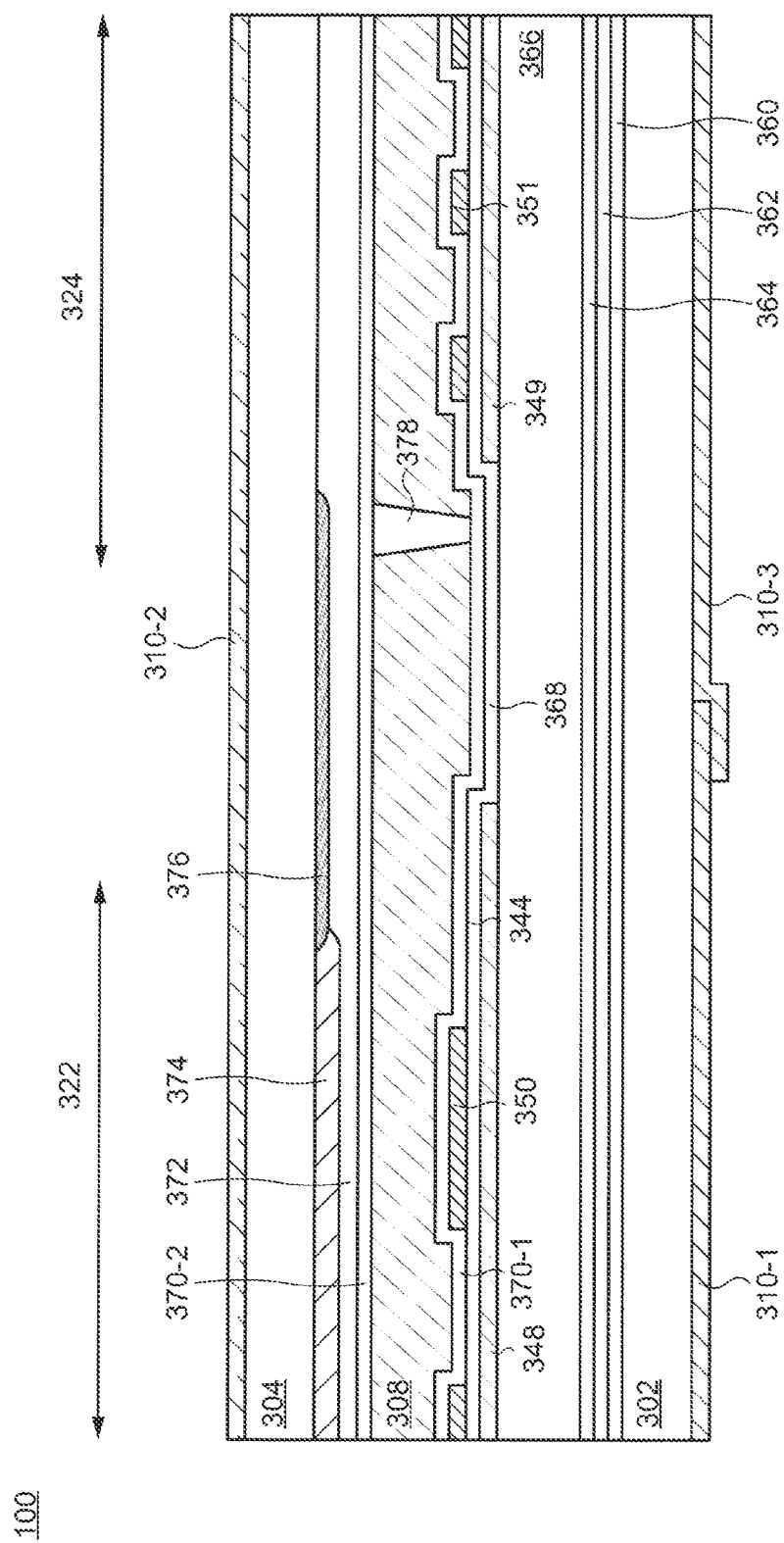
FIG. 16 is a schematic cross-sectional view of a pixel and a dimming element of a display device according to an embodiment of the present invention.
Figure 17:
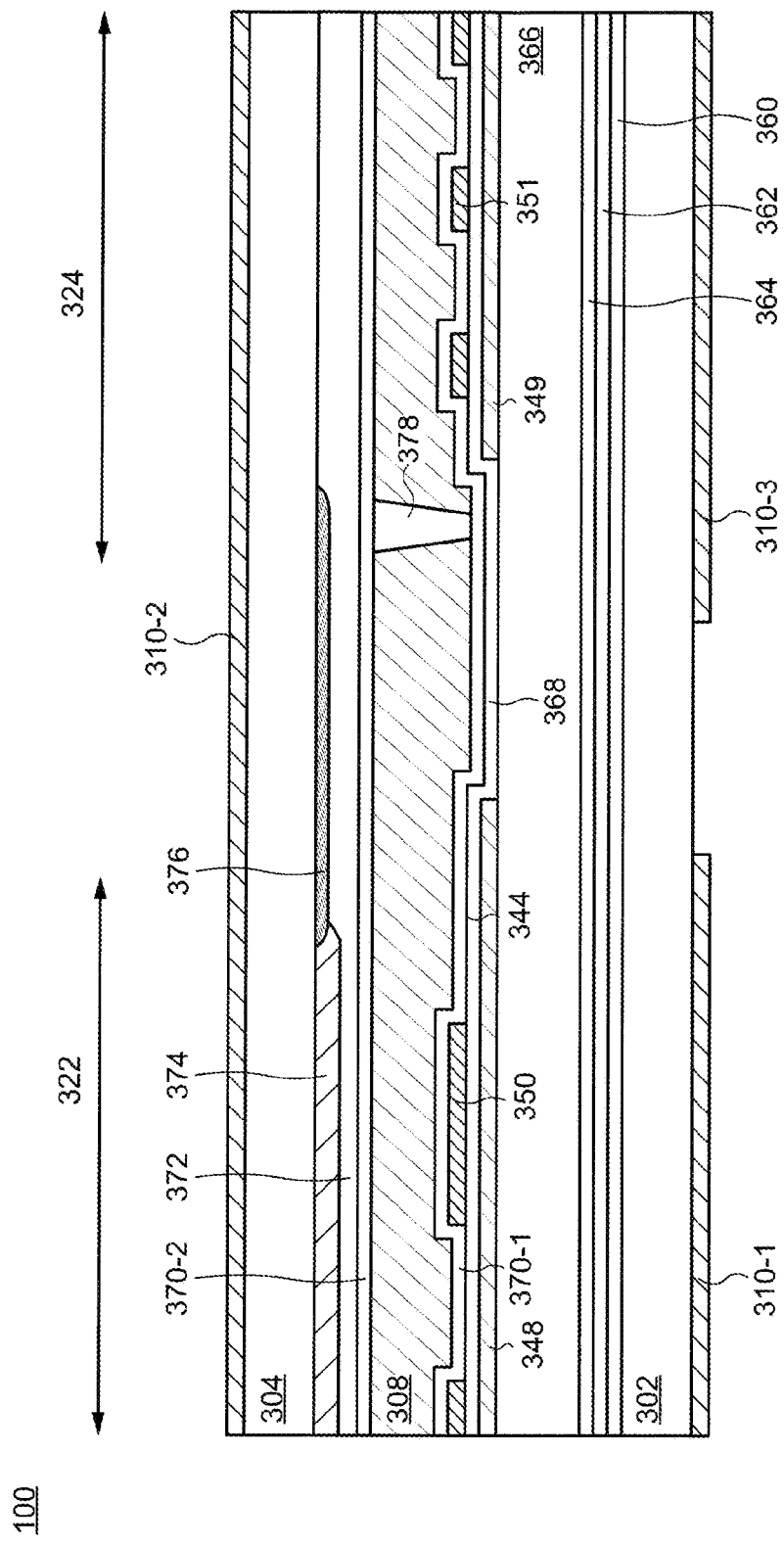
FIG. 17 is a schematic cross-sectional view of a pixel and a dimming element of a display device according to an embodiment of the present invention.

FIG. 16 and FIG. 17 are schematic cross-sectional views respectively centering the dimming element 324 and the pixel 322. As shown in this FIG. 16, a part of the first linear polarizing plate 310-1 and a part of the third linear polarizing plate 310-3 may overlap with each other between the dimming element 324 and the pixel 322. The third linear polarizing plate 310-3 may overlap with the part of the first linear polarizing plate 310-1 so that the part of the first linear polarizing plate 310-1 is located between the third linear polarizing plate 310-3 and the array substrate 302, or a reverse relationship may be employed. In this case, the black matrix 376 may be disposed so as to overlap with the first linear polarizing plate 310-1 and the third linear polarizing plate 310-3. Alternatively, the first linear polarizing plate 310-1 and the third linear polarizing plate 310-3 may be placed with a gap therebetween as shown in FIG. 17. In this case, a part of the array substrate 302 is exposed from the first linear polarizing plate 310-1 and the third linear polarizing plate 310-3. The black matrix 376 may be disposed so as to overlap with the exposed portion, the third linear polarizing plate 310-3, and the first linear polarizing plate 310-1 in order to shield light.

Figure 18A:
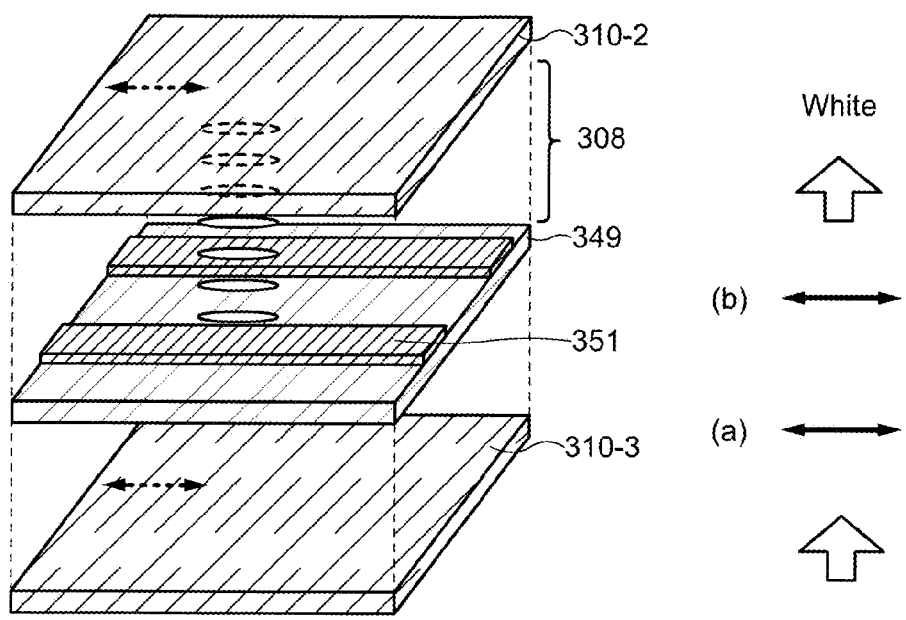
FIG. 18A and FIG. 18B are schematic perspective views for explaining the operation of a display device according to an embodiment of the present invention.
Figure 18B:
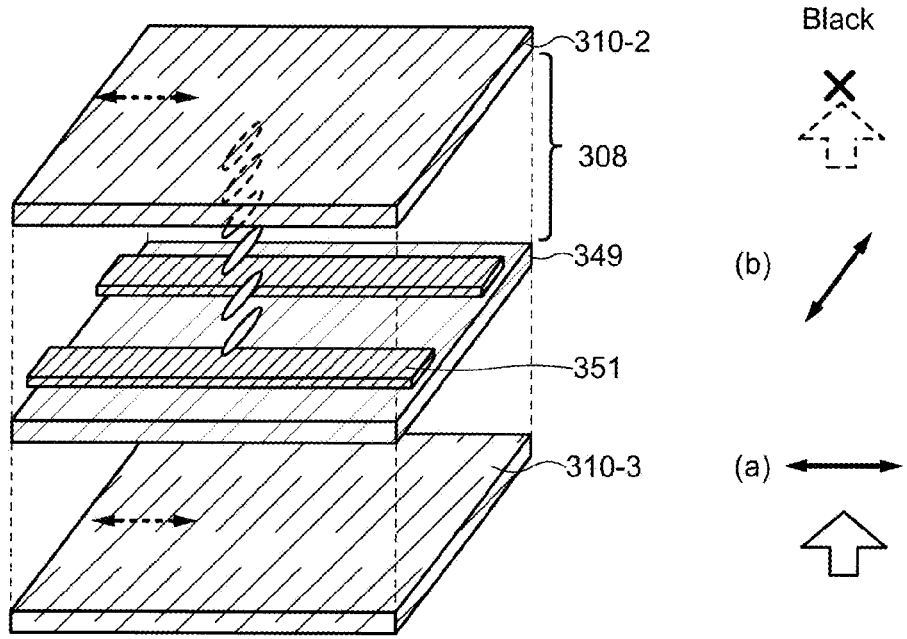

The operation of the dimming element 324 having the aforementioned structure is explained using FIG. 18A and FIG. 18B. These figures respectively correspond to FIG. 8A and FIG. 8B, and a part of the components such as the liquid crystal layer 308 is omitted.

(1) Initial State

FIG. 18A is a schematic perspective view of the dimming element 324 in an off state. In this state, the orientation of the liquid crystal molecules is determined by the orientation characteristics of the first orientation film 370-1 and the second orientation film 370-2. Since the orientation treatment directions of the first orientation film 370-1 and the second orientation film 370-2 are the same as each other, the liquid crystal molecules substantially orient along the orientation treatment directions in the absence of an electric field.

Here, a case is considered in which light indicated by a hollow arrow proceeds from the side of the third linear polarizing plate 310-3 toward the side of the second linear polarizing plate 310-2. This light becomes linearly polarized light (a) parallel to the transmission axis when passing through the third linear polarizing plate 310-3 and then enters the liquid crystal layer 308. When the orientation treatment is performed on the orientation films 370 so that the orientation treatment directions are parallel to the transmission axis, the polarizing axis of the linearly polarized light (a) and the orientation direction of the liquid crystal molecules are substantially parallel. Hence, no phase variation of the light occurs, and this linearly polarized light (a) is incident on the second linear polarizing plate 310-2 as linearly polarized light (b), maintaining the polarizing axis and intensity. Since the transmission axis of the second linear polarizing plate 310-2 is parallel to that of the third linear polarizing plate 310-3, the linearly polarized light (b) passes through the second linear polarizing plate 310-2 and radiates outside. Thus, the dimming element 324 is normally white in the off state.

(2) Operation

FIG. 18B is a schematic perspective view in an on state produced by providing a potential difference between the lower electrode 349 and the upper electrode 351. This potential difference generates an electric field substantially parallel to the surface of the array substrate 302, and the liquid crystal molecules rotate in the plane parallel to the surface of the array substrate 302 due to the dielectric anisotropy of the liquid crystal molecules. Hence, the polarizing axis of the linearly polarized light (a) incident on the liquid crystal layer 308 and the orientation direction of the liquid crystal molecules are shifted from each other, which causes a phase retardation of the light incident on the liquid crystal layer 308. In the display device 100, it is preferred to control the thickness of the liquid crystal layer 308 in accordance with the refractive indexes of the liquid crystal molecules in the long axis direction and the short axis direction so that the phase retardation is π. In such a case, when passing through the liquid crystal layer 308, the light becomes linearly polarized light (b) which is obtained by rotating the polarizing axis of the linearly polarized light immediately before entering the liquid crystal layer 308. When the orientation of the liquid crystal molecules rotates by 90°, the polarizing axis of this linearly polarized light (b) perpendicularly intersects with the polarizing axis of the linearly polarized light (a). Since the third linear polarizing plate 310-3 and the second linear polarizing plate 310-2 are in the parallel Nichol relationship, the linearly polarized light (b) cannot pass through the second linear polarizing plate 310-2.

The amount of the extracted light is determined by the rotation angle of the liquid crystal molecules, and the rotation angle can be controlled by the potential difference between the lower electrode 349 and the upper electrode 351 based on the potential of the dimming-controlling signal. Therefore, control of this potential enables the transmissivity of the dimming element 324 to be controlled, which allows the dimming element 324 to function as a neutral density filter (ND filter) or a shutter. For example, the amount of light incident on the photoelectric transducer 400 can be optimized by appropriately controlling the potential difference between the upper electrode 351 and the lower electrode 349 in accordance with an external environment. In addition, when the dimming element 324 is controlled by further increasing this potential difference so that light cannot substantially transmit the dimming element 324, it is possible to prevent an adverse influence on the display formed by the pixels 322 because the outside light reflected by the photoelectric transducer 400 can be shielded.

Fourth Embodiment

An example of a manufacturing method of the display device 100 having the structure described in the First Embodiment is explained in the present embodiment. An explanation of the structure the same as or similar to those described in the First to Third Embodiments may be omitted.

FIG. 19A to FIG. 22 are schematic cross-sectional views showing the manufacturing method of the display device 100, and the left side and the right side respectively demonstrate a part of the pixel 322 and a part of the dimming element 324 in each drawing.

1. Array Substrate

FIG. 19A is a schematic view in which the components up to the interlayer insulating film 364 are formed over the array substrate 302. An explanation is omitted because this structure can be fabricated applying the known methods and materials.

Etching is performed on the interlayer insulating film 364 to form openings reaching the semiconductor film 352, and a metal film is prepared to cover these openings. The metal film can be formed by stacking metal films including a metal such as molybdenum, tungsten, titanium, or aluminum with a sputtering method, a chemical vapor deposition (CVD) method, and the like. After that, the metal film is subjected to etching processing to form the image-signal line 342, the drain electrode 354, and the dimming-controlling element 358 (FIG. 19B). With this process, the transistor 346 is fabricated. As described above, the part of the image-signal line 342 functions as the source electrode of the transistor 346.

After that, the leveling film 366 is formed so as to cover the transistor 346 and the dimming-controlling line 358 (FIG. 19C). The leveling film is formed by applying a precursor of the polymer described in the First Embodiment with a wet-type film formation method such as a spin-coating method, a dip-coating method, an ink-jet method, and a printing method, and then curing the precursor.

After that, the common electrode 348 is fabricated over the leveling film 366 (FIG. 19C). The common electrode 348 is configured so as to transmit visible light. Therefore, the common electrode 348 may be formed with a sputtering method and the like using a conductive oxide exhibiting transmitting properties with respect to visible light, such as a mixed oxide of indium and tin (ITO) and a mixed oxide of indium and zinc (IZO). Although not illustrated, the power-source line 344 is formed after forming the common electrode 348. The power-source line 344 is fabricated by stacking the films including the aforementioned metal with a sputtering method, a CVD method, or the like. Note that, when the dimming element 324 forms an FFS liquid crystal element as described in the Third Embodiment, the lower electrode 349 may be simultaneously formed when the common electrode 348 is formed. Hence, the common electrode 348 and the lower electrode 349 can exist in the same layer and possess the same composition and thickness in this case.

Figure 20A:
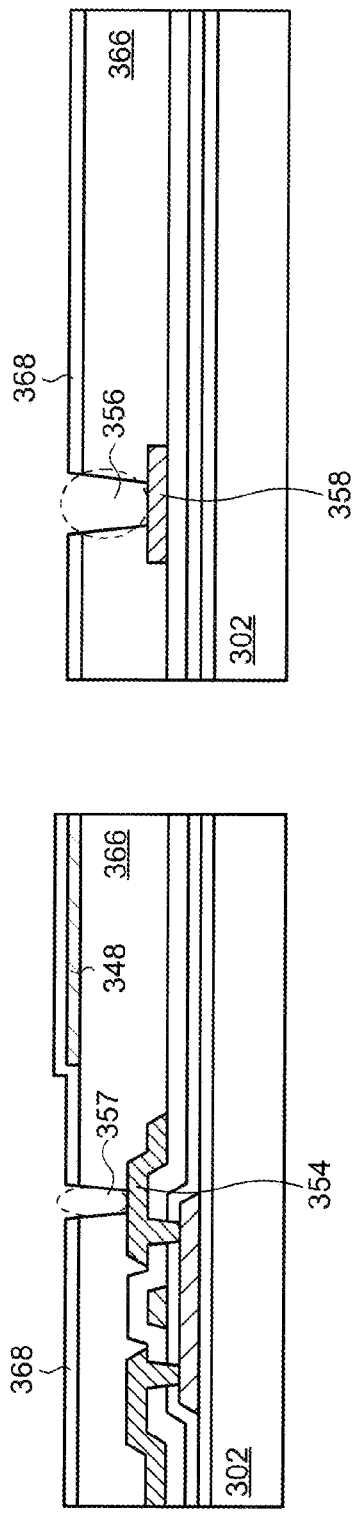
FIG. 20A and FIG. 20B are schematic cross-sectional views for explaining a manufacturing method of a display device according to an embodiment of the present invention.

After that, the interelectrode insulating film 368 is formed so as to cover the common electrode 348 and the dimming-controlling line 358 (FIG. 20A). The interelectrode insulating film 368 includes the aforementioned silicon-containing inorganic compound and is formed using a CVD method or a sputtering method. Next, etching is performed on the interelectrode insulating film 368 and the leveling film 366 to form the openings 357 and 356 respectively reaching the drain electrode 354 and the dimming-controlling line 358 (FIG. 20A).

Figure 20B:
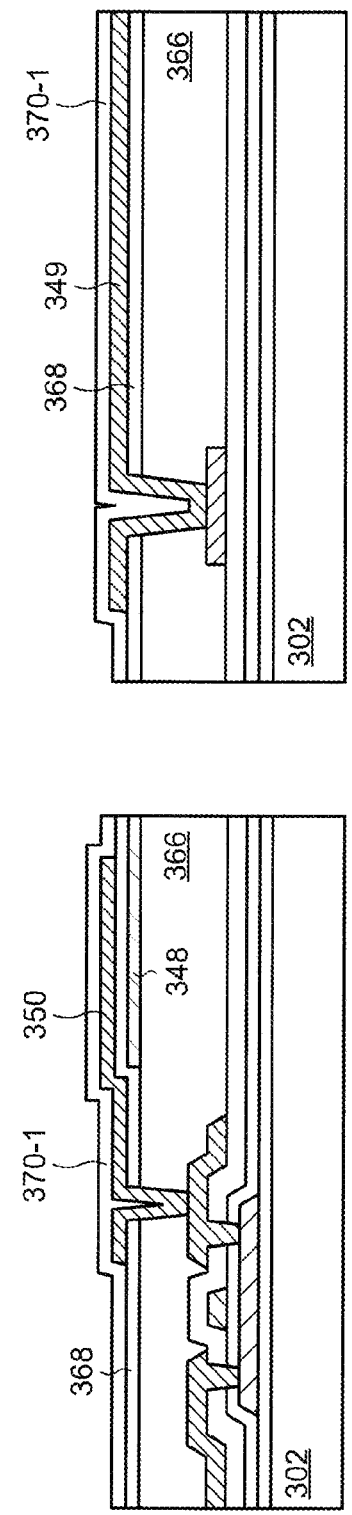
Figure 22:
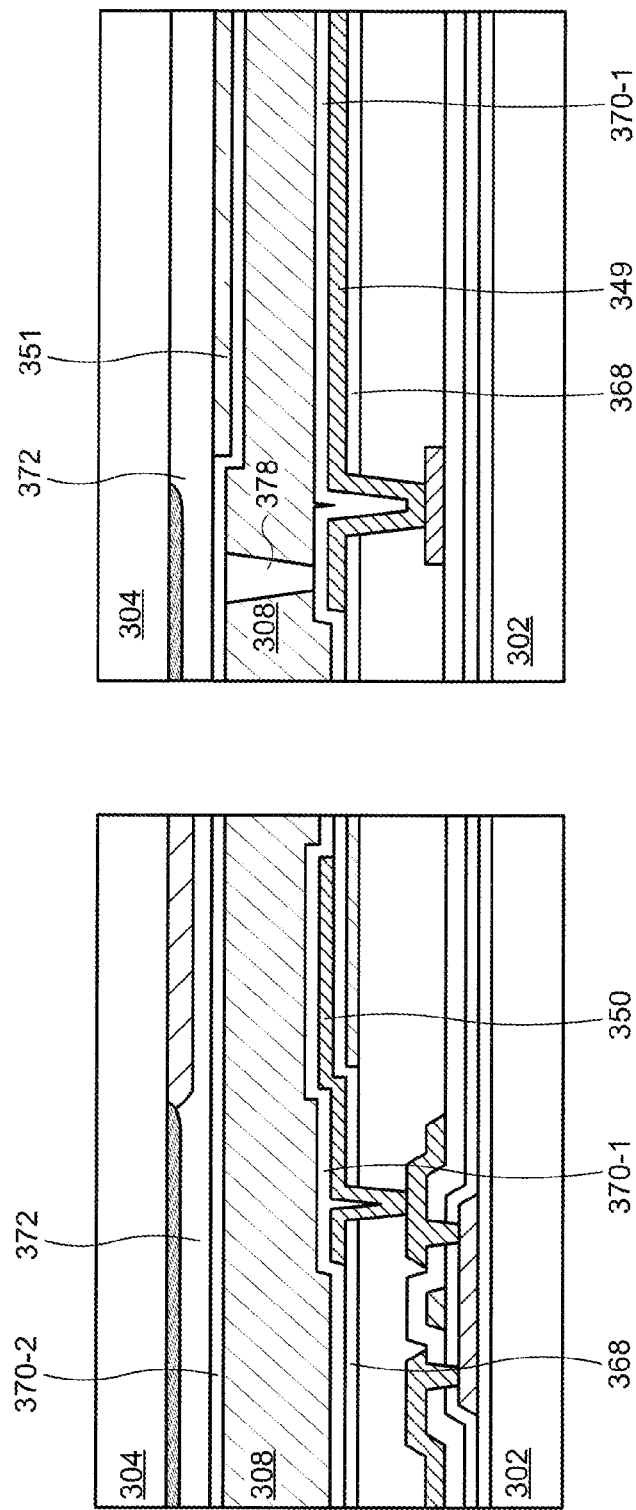
FIG. 22 is a schematic cross-sectional view for explaining a manufacturing method of a display device according to an embodiment of the present invention.

After that, the pixel electrode 350 and the lower electrode 349 are fabricated so as to be in contact with the drain electrode 354 and the dimming-controlling line 358, respectively (FIG. 20B). These electrodes are also preferred to have a high transmitting property with respect to visible light, and therefore, may be formed with a sputtering method using a conductive oxide having a light-transmitting property, such as ITO and IZO. Since the pixel electrode 350 and the lower electrode 349 can be simultaneously formed, these electrodes can exist in the same layer and have the same composition and thickness. Although not illustrated, when the dimming element 324 forms an FFS liquid crystal element, the upper electrode 351 may be simultaneously formed when the pixel electrode 350 is fabricated. Therefore, the pixel electrode 350 and the upper electrode 351 can exist in the same layer and have the same composition and thickness in this case.

After that, the first orientation film 370-1 is formed so as to cover the pixel electrode 350 and the lower electrode 349 (FIG. 20B). The first orientation film 370-1 may be formed by applying a polyimide precursor with a wet-type film formation method, curing the precursor, and then performing a rubbing treatment. The known methods may be applied in the rubbing treatment.

2. Counter Electrode

The color filter 374 and the black matrix 376 are formed over the counter substrate 304 (FIG. 21A). The black matrix 376 is prepared so as to cover the transistor 346, the image-signal line 342, the gate line 340, and the like in the pixel 322, while the black matrix 376 is prepared so as to cover the dimming-controlling line 358 in the dimming element 324. In the dimming element 324, a transparent film may be formed as the color filter 374, or no color filter 374 may be provided. In the case where the overcoat 372 is formed, the overcoat 372 is formed so as to cover the color filter 374 and the black matrix 376 (FIG. 21B). The color filter 374, black matrix 376, and overcoat 374 can be prepared using the known methods and materials. Thus, a detailed explanation is omitted.

After that, the upper electrode 351 of the dimming element 324 is fabricated (FIG. 21C). The upper electrode 351 may be formed by applying the same method for the fabrication of the lower electrode 349, the common electrode 348, and the pixel electrode 350. After that, the second orientation film 370-2 is formed so as to cover the color filter 374, the black matrix 376, and the upper electrode 351. The second orientation film 370-2 may be also formed with the same method as that of the first orientation film 370-1. The spacer 378 which is an optional element is formed over the second orientation film 370-2 by applying the known methods and materials (FIG. 21C). The spacer 378 may be fabricated over the first orientation film 370-1 formed over the array substrate 302.

3. Cell Fabrication

After that, the liquid crystal layer 308 is formed. Specifically, the sealing material 306 is applied over one of the array substrate 302 and the counter substrate 304, and the liquid crystal is dropped on the region formed by the sealing material 306. After that, the other of the array substrate 302 and the counter substrate 304 is arranged over the liquid crystal and the sealing film 306 so that the pixel electrode 350, the common electrode 348, the lower electrode 349, and the upper electrode 351 are sandwiched by the array substrate 302 and the counter substrate 304, and then the sealing material 306 is cured. At this time, the pixel electrode 350 and the common electrode 348 do not overlap with the upper electrode 351 and are exposed from the upper electrode 351. With this process, the array substrate 302 and the counter electrode 304 are bonded and fixed to each other. Alternatively, the array substrate 302 and the counter electrode 304 are bonded using the sealing material 306 in advance. In this case, the sealing material 306 is formed so as not to have a closed shape but to be divided into two portions. After curing the sealing material 306, the liquid crystal is injected from the gap between the separated two sealing materials 306, the sealing material 306 is further applied between the cured sealing films 306, and then the sealing film 306 is cured. With this process, the sealing film 306 provides a single closed shape. Note that, when the spacer 378 is not fabricated, particle spacers may be mixed in the liquid crystal.

Through the aforementioned processes, the display device 100 can be manufactured.

Implementation of the embodiments of the present invention, a display device with a small frame region and a wide display region can be produced. Since a variety of photoelectric transducers can be mounted so as to overlap with the display region in this display device, the embodiments of the present invention provide a high degree of freedom in designing a display device. In addition, it is possible to control the amount of light incident on the photoelectric transducer without reduction of display quality by controlling transmissivity of the dimming element disposed in the display region and overlapping with the photoelectric transducer.

It is understood that another effect different from that provided b y each of the aforementioned embodiments is achieved by the present invention if the effect is obvious from the description in the specification or readily conceived by persons ordinarily skilled in the art.

What is claimed is:

1. An imaging device comprising:
   two image sensors;
   two diming elements respectively above the image sensors, the dimming elements comprising an array substrate having lower electrodes, a counter substrate having upper electrodes, and a liquid crystal layer between the array substrate and the counter substrate,
   two pairs of waveplates sandwiching the array substrate, each pair of the two pairs of waveplates only overlapping one of the two image sensors, respectively, in a plan view;
   a pair of linear polarizing plates sandwiching the two pairs of waveplates;
   a plurality of pixels in a display region surrounding the two dimming elements; and
   color filters in the plurality of pixels,
   wherein the color filters are not placed in the dimming element.

2. The imaging device according to claim 1, wherein the two pairs of waveplates are each a $\lambda/4$ waveplate.

3. The imaging device according to claim 2, wherein transmission axes of the pair of linear polarizing plates orthogonally intersect each other, and slow axes of the two pairs of $\lambda/4$ waveplates orthogonally intersect each other.

4. The imaging device according to claim 1, wherein the two pairs of waveplates are each a $\lambda/2$ waveplate.

5. The imaging device according to claim 4, wherein transmission axes of the pair of linear polarizing plates orthogonally intersect each other, and slow axes of the two pairs of $\lambda/2$ waveplates orthogonally intersect each other.

6. The display device according to claim 1, wherein each of the lower electrode and the upper electrode has a plurality of slits arranged in a stripe form.

7. The display device according to claim 6, wherein at least one of the plurality of slits of the upper electrode overlaps with a region between the adjacent slits of the lower electrode.

8. The display device according to claim 6, wherein a pitch of the plurality of slits of the lower electrode and a pitch of the plurality of slits of the upper electrode are the same as each other.

9. The display device according to claim 1, wherein the diming element is different in size from each of the plurality of pixels.

* * * * *